United States Patent [19]

Ishida et al.

[11] Patent Number: 5,159,470
[45] Date of Patent: Oct. 27, 1992

[54] IMAGE PROCESSING METHOD AND APPARATUS WITH REDUCTION OF GRANULAR NOISE, ETC.

[75] Inventors: Shinichi Ishida, Yokohama; Masahiro Sakamoto, Tokyo; Yasuyuki Shinada; Takeshi Ono, both of Yokohama, all of Japan

[73] Assignee: Canon Kabushiki Kaisha, Tokyo, Japan

[21] Appl. No.: 501,877

[22] Filed: Mar. 30, 1990

Related U.S. Application Data

[63] Continuation of Ser. No. 346,906, May 3, 1989.

[30] Foreign Application Priority Data

May 11, 1988 [JP] Japan .................. 63-115771
May 11, 1988 [JP] Japan .................. 63-115777
May 11, 1988 [JP] Japan .................. 63-115778

[51] Int. Cl.⁵ ............................................. H04N 1/40
[52] U.S. Cl. ..................................... 358/457; 358/443; 358/459; 382/50
[58] Field of Search .............. 358/75, 80, 75 IJ, 296, 358/298, 456, 457, 458, 459, 443, 448; 346/76 PH; 352/50, 54

[56] References Cited

U.S. PATENT DOCUMENTS

| | | | |
|---|---|---|---|
| 3,294,986 | 12/1966 | Young ........................ | 178/5 |
| 3,681,650 | 8/1972 | Koll ........................... | 315/30 |
| 4,339,774 | 7/1982 | Temple . | |
| 4,668,995 | 5/1987 | Chen et al. .................. | 358/459 |
| 4,680,645 | 7/1987 | Dispoto et al. .............. | 358/298 |
| 4,878,125 | 10/1989 | Katayama et al. ............ | 358/443 |
| 4,924,322 | 5/1990 | Kurosawa et al. ............ | 358/448 |
| 4,958,218 | 9/1990 | Katayama et al. ............ | 358/75 |
| 4,958,238 | 9/1990 | Katayama et al. ............ | 358/455 |
| 4,969,052 | 11/1990 | Ishida et al. ................. | 358/457 |
| 5,008,950 | 4/1991 | Katayama et al. ............ | 358/455 |
| 5,068,746 | 11/1991 | Ohsawa et al. .............. | 358/443 |

FOREIGN PATENT DOCUMENTS

| | | |
|---|---|---|
| 132794 | 2/1985 | European Pat. Off. . |
| 272147 | 6/1988 | European Pat. Off. . |
| 2007849 | 1/1970 | France . |
| 2497043 | 6/1982 | France . |

OTHER PUBLICATIONS

"Digital Halftoning Using Biased Error Diffusion", in *IBM Technical Disclosure Bulletin*, vol. 26, No. 10B, pp. 5723–5727.
"An Adaptive Algorithm for Spatial Gray Scale", in SID Digest, 1975.

*Primary Examiner*—Edward L. Coles, Sr.
*Assistant Examiner*—Kim Yen Vu
*Attorney, Agent, or Firm*—Fitzpatrick, Cella, Harper & Scinto

[57] ABSTRACT

According to the present invention, when image data are subjected to quantization processing using an error diffusion method, the generation of a striped pattern which is a cause for deterioration of picture quality in the error diffusion method is prevented. In the present invention, an original image is read and image data are generated. The image data obtained by reading the original image are quantized using an error diffusion method, and the quantized image data can be output and recorded by a thermal-head printer. Furthermore, according to the present invention, an error between the density of an input image and the density of an output image after being subjected to a quantization processing using an error diffusion method is perfectly preserved. In an image processing apparatus for performing a quantization by dispersing an error between input image data and output image data which arises when the input image data are quantized, to image data of surrounding picture elements, the error between the input image data and the output image data is computed or otherwise determined, the error is subjected to a predetermined weighting processing, the error subjected to the weighting processing is dispersed to surrounding picture elements, and a surplus of the error generated in the weighting processing is corrected.

7 Claims, 24 Drawing Sheets

FIG. 3

| INPUT | OUTPUT |
|---|---|
| 0 | 63 |
| 1 | 52 |
| 2 | 46 |
| 3 | 42 |
| 4 | 38 |
| 5 | 35 |
| 6 | 33 |
| 7 | 31 |
| 8 | 29 |
| 9 | 28 |
| 10 | 26 |
| 11 | 25 |
| 12 | 24 |
| 13 | 23 |
| 14 | 21 |
| 15 | 21 |
| 16 | 20 |
| 17 | 19 |
| 18 | 18 |
| 19 | 17 |
| 20 | 16 |
| 21 | 16 |
| 22 | 15 |
| 23 | 14 |
| 24 | 14 |
| 25 | 13 |
| 26 | 13 |
| 27 | 12 |
| 28 | 11 |
| 29 | 11 |
| 30 | 10 |
| 31 | 10 |
| 32 | 10 |
| 33 | 9 |
| 34 | 9 |
| 35 | 8 |
| 36 | 8 |
| 37 | 7 |
| 38 | 7 |
| 39 | 7 |
| 40 | 6 |
| 41 | 6 |
| 42 | 6 |
| 43 | 5 |
| 44 | 5 |
| 45 | 5 |
| 46 | 4 |
| 47 | 4 |
| 48 | 4 |
| 49 | 3 |
| 50 | 3 |
| 51 | 3 |
| 52 | 2 |
| 53 | 2 |
| 54 | 2 |
| 55 | 2 |
| 56 | 1 |
| 57 | 1 |
| 58 | 1 |
| 59 | 1 |
| 60 | 0 |
| 61 | 0 |
| 62 | 0 |
| 63 | 0 |

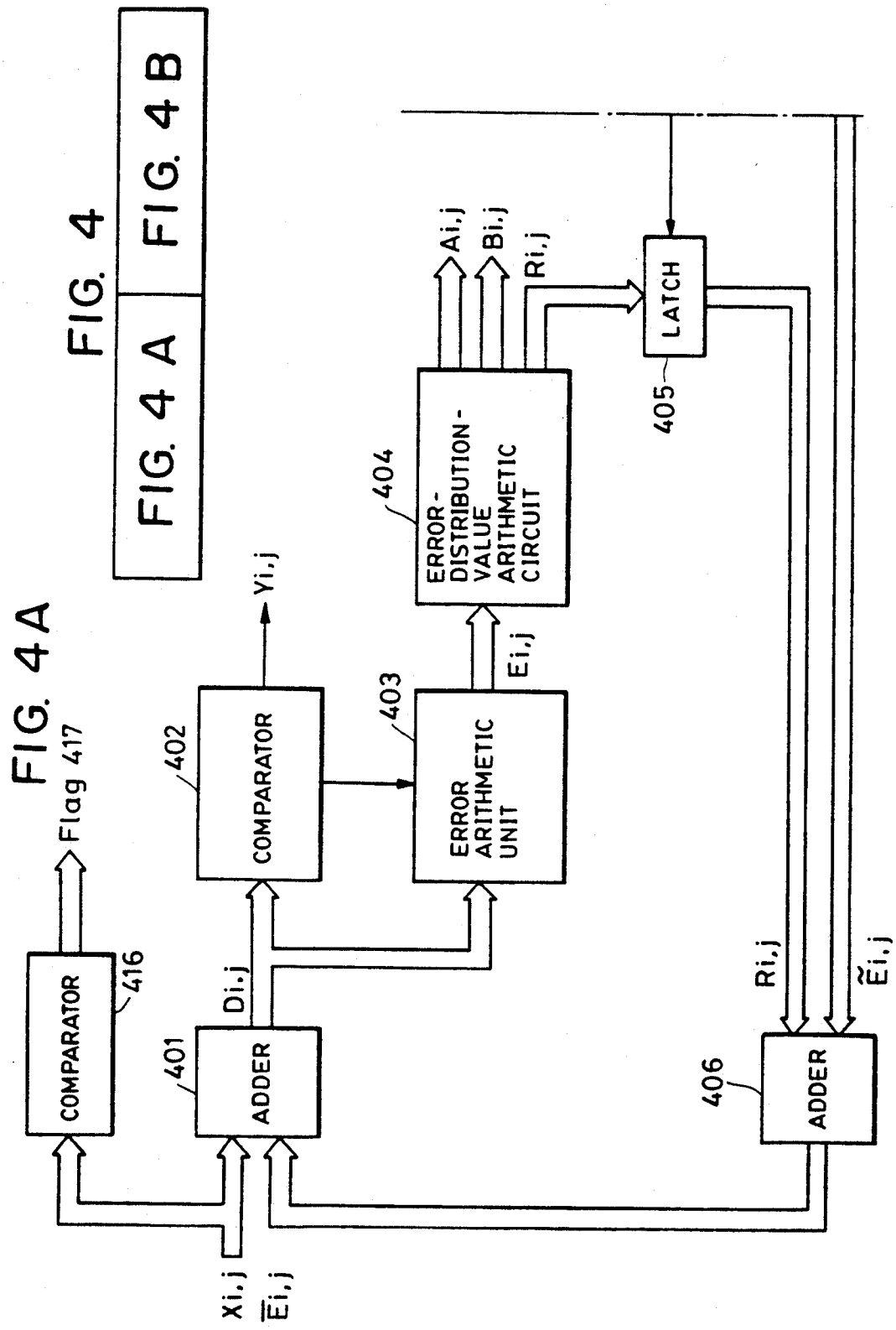

FIG. 6 (a)

| | $X_1$ | $P_1$ |
|---|---|---|
| $Q_1$ | $R_1$ | $S_1$ |

| | $(X_1)$ | $P_1$ | | | |
|---|---|---|---|---|---|
| $Q_1$ | $R_1$ | $S_1$ | | | |

FIG. 6 (b)

| | $X_2$ | $P_2$ |
|---|---|---|
| $Q_2$ | $R_2$ | $S_2$ |

| | $(X_1)$ | $(X_2)$ $P_1$ | $P_2$ | | |
|---|---|---|---|---|---|
| $Q_1$ | $R_1$ $Q_2$ | $S_1$ $R_2$ | $S_2$ | | |

FIG. 6 (c)

| | $X_3$ | $P_3$ |
|---|---|---|
| $Q_3$ | $R_3$ | $S_3$ |

| | $(X_1)$ | $(X_2)$ $P_1$ | $(X_3)$ $P_2$ | $P_3$ | |
|---|---|---|---|---|---|
| $Q_1$ | $R_1$ $Q_2$ | $S_1$ $R_2$ $Q_3$ | $S_2$ $R_3$ | $S_3$ | |

HIGHLIGHT PORTION

HALF-TONE PORTION

DARK PORTION

FIG. 13(a)
| 1 | 1 | 0 | 1 | 0 |
|---|---|---|---|---|
| 0 | 1 | 0 | 1 | 1 |
| 1 | 1 | 1 | 0 | 0 |
| 0 | 1 | 1 | 1 | 0 |
| 0 | 0 | 1 | 1 | 1 |
FIG. 13(b)
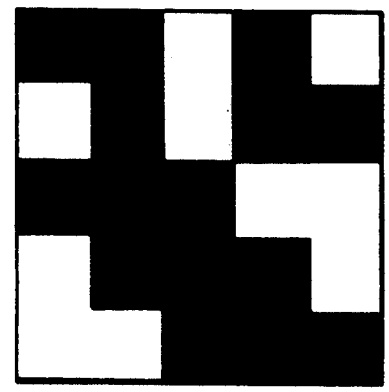
FIG. 13(c)
| 0 | 0 | 0 | 0 | 1 |
|---|---|---|---|---|
| 0 | 0 | 0 | 1 | 0 |
| 1 | 0 | 1 | 0 | 0 |
| 0 | 0 | 0 | 0 | 0 |
| 0 | 1 | 0 | 0 | 0 |
FIG. 13(d)
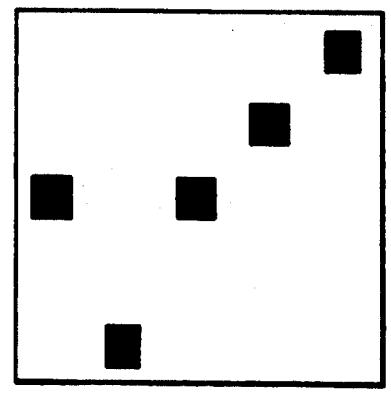

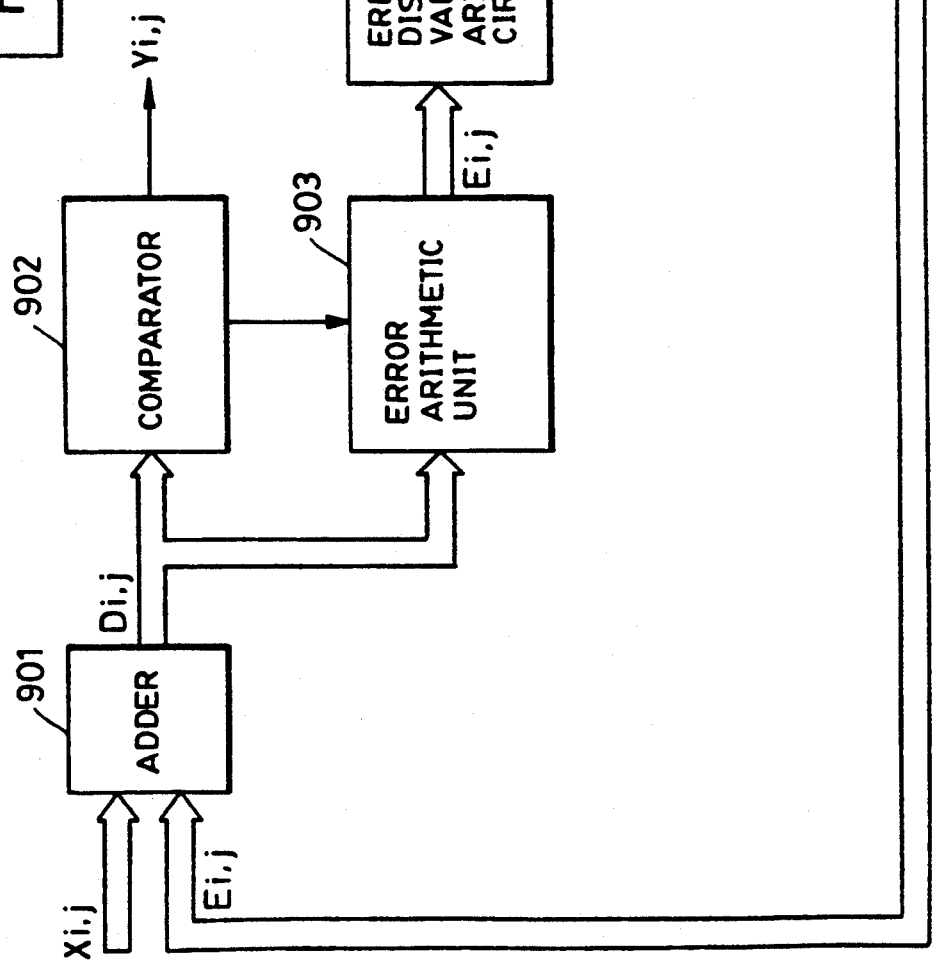

|  | i | i+1 | i+2 |
|---|---|---|---|
| j | X | 0 | 1 |
| j+1 | 1 | 4 | 2 |

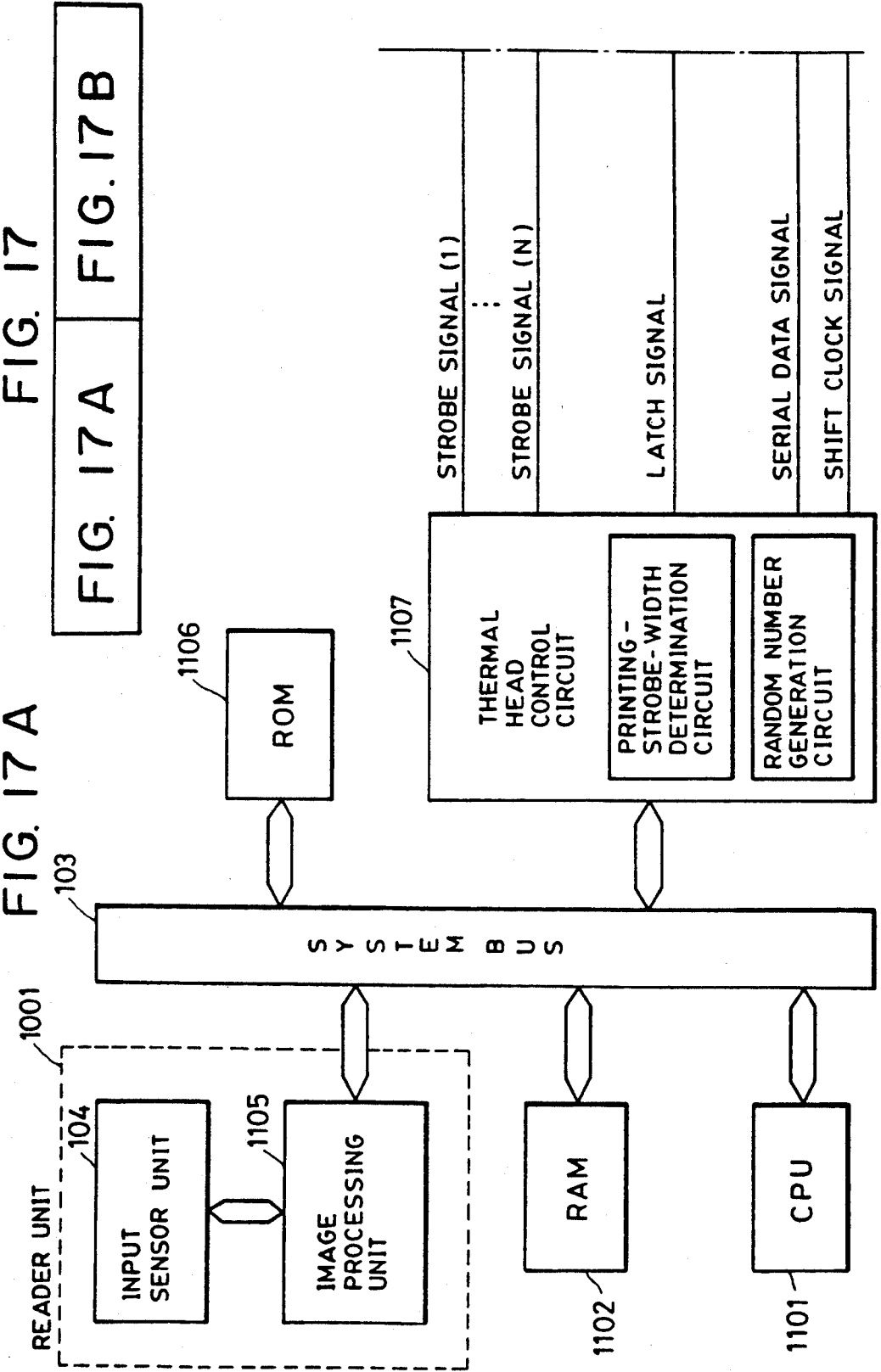

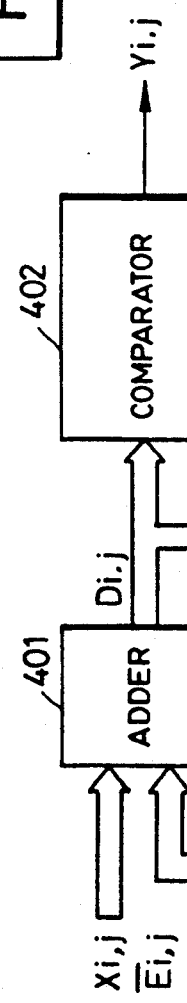
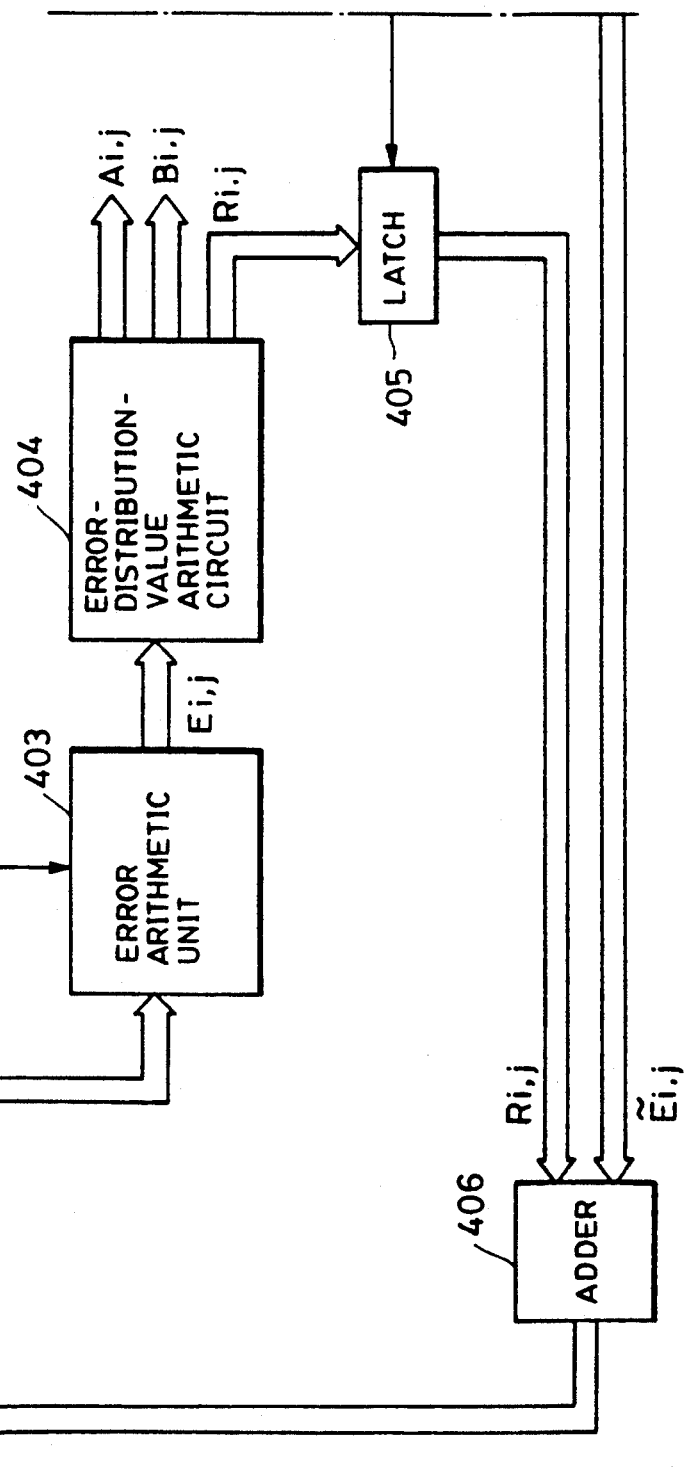
FIG. 18A

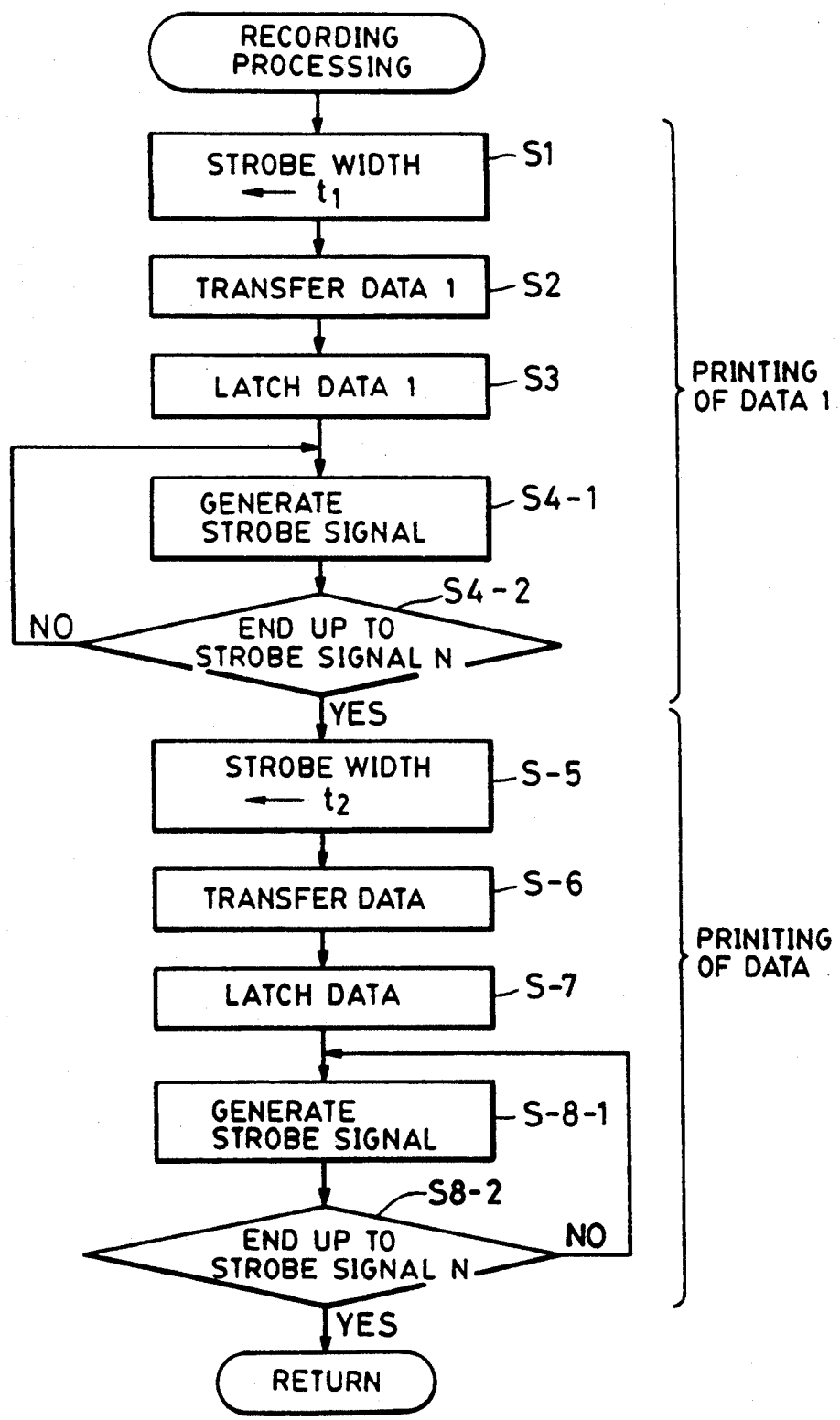

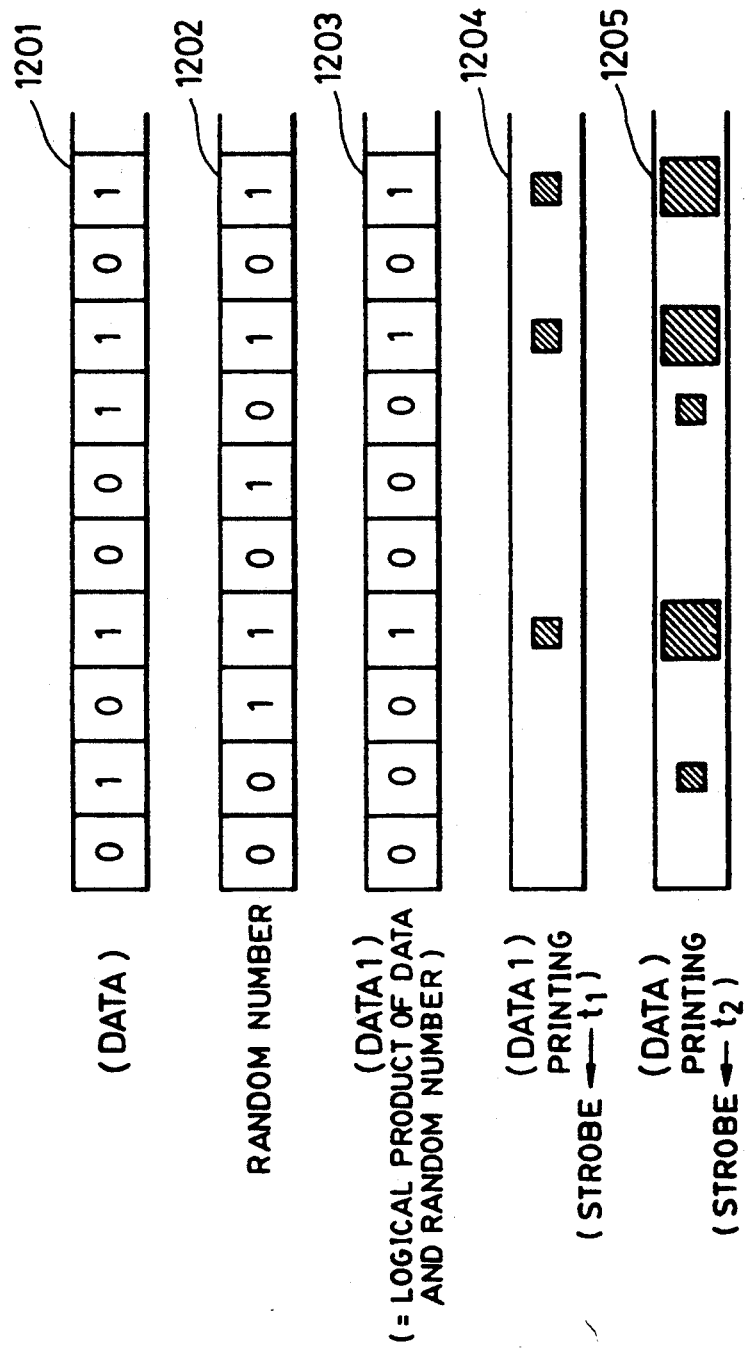

RND(1) IS A RANDOM FUNCTION
OUTPUT VALUE OF WHICH IS 0 OR 1

IMAGE PROCESSING METHOD AND APPARATUS WITH REDUCTION OF GRANULAR NOISE, ETC.

This application is a continuation of application Ser. No. 07/346,906 filed May 3, 1989.

BACKGROUND OF THE INVENTION

1. Field of the Invention

This invention relates to an image processing method and apparatus for performing a quantization processing of image data, and more particularly, to an image processing method and apparatus for reproducing a half-tone image.

2. Description of the Prior Art

Heretofore, there has been known an error diffusion method for use as an image processing method for reproducing a half-tone image by, for example, a binary image reproducing, in a digital copier, digital facsimile and the like.

In this method, a difference in density, for every picture element, between the density of an image of an original document and the density of the corresponding picture element of the binary-coded output image, that is, an error, is determined, and the value of the error so determined is dispersed, after performing a specific weighting to picture elements surrounding the picture element in question in accordance with coefficients of a weighting matrix.

Since this method spatially clears an error which is a difference in density between an image of an original document and an output image, there is no limitation on the number of gradations due to the size of a matrix as in a dither processing (which is another binary-coding method), and it is possible to perform a threshold processing which depends on the value of a picture element.

Accordingly, the error diffusion method makes possible compatibility of gradation and resolution, which is a problem in dither processing.

The error diffusion method has been presented in R. W. Floyd and L. Steinberg, "An Adaptive Algorithm for Spatial Gray Scale", SID75 Digest (1976).

The expression of the error diffusion method is as follows. In the following expression, input data are assumed to be of 6 bits;

$$D_{i,j} = X_{i,j} + (\Sigma\Sigma \alpha_{i+m,j+n} E_{i+m,j+n})(1/\Sigma\alpha_{m,n})$$

$$Y_{i,j} = 63 (D_{i,j} \geq T)$$

$$Y_{i,j} = 0 (D_{i,j} < T),$$

where
- $D_{i,j}$: the density of the picture element (i,j) in question after correction
- $X_{i,j}$: the density of an input image of the picture element (i,j) in question
- $E_{i,j}$: the error when the picture element (i,j) in question is binary-coded
- $\alpha_{i,j}$: weighting cofficient
- $Y_{i,j}$: the density of an output image
- T: threshold value.

That is, in the above expression, weighted (by multiplying $\alpha_{i+m,j+n}$ and dividing by $\Sigma\alpha_{m,n}$) values of errors $E_{i+m,j+n}$ generated at surrounding picture elements are added to the density $X_{i,j}$ of an input image of the picture element in question, and the resultant value becomes the density $D_{i,j}$ of the picture element in question after error correction. The density $Y_{i,j}$ of an output image is obtained by binary-coding the $D_{i,j}$ using a threshold value T (for example, T=32).

A printer performs an on/off control of a dot (i.e., prints a dot or not) in accordance with the value of the $Y_{i,j}$ to perform image formation.

However, when highlight portions of an image are binary-coded by the error diffusion method, there is the disadvantage that grain-like noises are generated in the highlight portions of the image. In order to remove this disadvantage, the assignee of the present invention has filed Ser. No. 289,017.

The error diffusion method also has the disadvantage that a unique texture (a striped pattern) appears in highlight and half-tone portions of an image. This is caused by dots of binary outputs connected in a line.

Now, the cause of such generation of the texture will be investigated. As described above, in the error diffusion method, an error generated in a picture element in question is weighted using a weighting matrix and diffused to surrounding picture elements.

For example, a weighting matrix $\alpha_{i,j}(X,1)$, that is, for a case in which an error generated at a picture element X in question is dispersed to an adjacent picture element to the right, will be investigated.

Since there is a higher probability of an output image being 0 in highlight and half-tone portions of an image compared with dark portions, a positive error is generated in many cases. A positive error is generated when an output image is made 0, since input image data have at least a certain degree of density.

When the positive error is dispersed to an adjacent picture element to the right with the above-described weighing matrix $\alpha_{i,j}(X,1)$, the probability of a dot being "on" at the dispersed picture element (the adjacent picture element) becomes high. When processing for one line of input image data is completed and the processing is shifted to the next line, the positive error is also dispersed to a picture element which corresponds to that in the preceding line (a picture element under that in the preceding line), and the probability of the dot of this picture element being "on" also becomes high.

That is, the probability of dots being "on" becomes high periodically in the subscanning direction, and a striped pattern is generated due to connection of these dots. An appearance of the generation of a striped pattern in the subscanning direction is shown in FIG. 25.

According to the shape of the weighting matrix, dots may also be connected in the main scanning direction or in an oblique direction, and a striped pattern is generated.

As described above, although, in the conventional error diffusion method, resolution is excellent compared with dither processing, a unique texture (this striped pattern) is generated in highlight and half-tone portions of an image, and it is impossible to reproduce an excellent image.

Now, in the error diffusion method, the processing for determining values to be distributed to surrounding picture elements from the error generated at a picture element in question will be investigated.

The error generated when the density $X_{i,j}$ of an input image of a picture element (i,j) in question is binary-coded is represented by $E_{i,j}$, and the weighting matrix $\alpha_{i,j}$ is represented by $$a_{i,j} = \frac{X4}{141}$$

X: a picture element in question.

In order to determine distribution values, first the error $E_{i,j}$ is divided by the sum 10 of numbers which make up the weighting matrix $a_{i,j}$, and values in which each coefficient of $a_{i,j}$ is multiplied by that sum become distribution values of the $E_{i,j}$ to surrounding picture elements.

For example, if $E_{i,j}=25$, the values become

| | |
|---|---|
| to picture element (i + 1, j) | 4*Int(25*1/10) = 8 |
| to picture element (i − 1, j) | 1*Int(25*1/10) = 2 |
| to picture element (i, j + 1) | 4*Int(25*1/10) = 8 |
| to picture element (i + 1, j + 1) | 1*Int(25*1/10) = 2. |

In this example, the configuration is provided by hardware, and is designed to truncate values to the right of the decimal point for the sake of simplification.

When the above-calculated distribution values are added, the result is $$E^*_{i,j} = 8 + 2 + 8 + 2 = 20.$$

This value is different from $E_{i,j}=25$.

The difference $(E_{i,j}-E^*_{i,j})$ is caused by neglecting the remainder when the error is divided by 10.

In the case of the error diffusion method, if there is a difference between the error generated at a picture element in question and the error diffused to surroundings, the density of an input image is not preserved. Hence, it results that the density of an input image does not equal the density of an output image, and the picture quality of the outout image deteriorates.

When a decimal-point operation (it is necessary to execute a decimal-point operation of at least two digits in order to prevent the deterioration of an image) is used in order to solve the above-described problems, circuit scale becomes very large, and so this approach is not an effective method.

As described above, the conventional error diffusion method has the disadvantage that, if an error due to a remainder or surplus which is generated when an error is weighed is neglected, density is not preserved, and picture quality deteriorates.

There is also the disadvantage that, if it is tried to suppress the influence of the remainder by performing a decimal-point operation, circuit scale becomes very large.

SUMMARY OF THE INVENTION

The present invention removes the above-described disadvantages of the prior art.

It is an object of the present invention to provide an image processing method and apparatus which can excellently reproduce all kinds of input images.

It is a further object of the present invention to provide an image processing method and apparatus which can suppress the generation of a stripped pattern which is a problem in an error diffusion method, by quantizing input image data using an error diffusion method and outputting and recording the quantized image data by means of a thermal-head printer.

It is a still further object of the present invention to provide an image processing method in which one apparatus transmits binary data which have been binary-coded by an error diffusion method to another apparatus, and the latter apparatus performs recording by means of a thermal-head printer according to the binary data sent from the one apparatus.

It is still another object of the present invention to provide an image processing method and apparatus which can reproduce an image which is faithful to an original image by recording image data subjected to quantization processing by an error diffusion method varying the sizes of dots.

It is still a further object of the present invention to provide an image processing method and apparatus which can preserve the density of an input image and the density of an output image with a device of a simple configuration, when image data are quantized by means of an error diffusion method.

These and other objects are accomplished, according to the preferred embodiments, by an image processing apparatus for performing quantization by dispersing an error between input image data and output image data when the input image data are quantized to image data of surrounding picture elements, the apparatus comprising:

arithmetic means for determining an error between the input image data and output image data;

processing means for performing a predetermined weighting processing to the error;

means for dispersing the error subjected to the weighting processing by the processing means; and correction means for correcting a remainder of the error which is generated when the weighting processing is performed in the processing means.

Still another object of the invention is to provide image processing method and apparatus which can eliminate particle-like noises in a highlight portion which are generated by the binarization process in an error diffusion method and can also improve an encoding efficiency.

These and other objects, features and advantages of the present invention will become more fully apparent from the following detailed description of the preferred embodiments taken in connection with the drawings.

BRIEF DESCRIPTION OF THE DRAWINGS

FIG. 3 is a diagram showing a brightness-density conversion table;

FIGS. 4A and 4B, is a block diagram showing the details of a binary-coding processing unit;

FIG. 6, consisting of FIGS. 6(a), 6(b) and 6(c) is a diagram showing flows of binary-coding processings in an error diffusion method;

FIG. 13 consisting of FIGS. 13(a), 13(b) and 13(d), is a diagram showing examples of printing in the second embodiment;

FIG. 14, which is divided into FIGS. 14A and 14B, is a block diagram showing another example of a binary-coding processing unit;

FIG. 17, which is divided into FIGS. 17A and 17B, is a block diagram showing a third embodiment of the present invention;

FIG. 18, which is divided into FIGS. 18A and 18B, is a block diagram showing the detail of a binary-coding processing unit in the third embodiment;

FIGS. 19, 22 and 23 are recording-control flow charts;

FIGS. 20, 21 and 24 are diagrams showing examples of recording in the third embodiment.

DETAILED DESCRIPTION OF THE PREFERRED EMBODIMENTS

The preferred embodiments of the present invention will be hereinafter explained with reference to the drawings.

First Embodiment

As a first embodiment, a case in which a laser-beam printer (LBP) is used in a recording unit will be explained.

Figure 1:
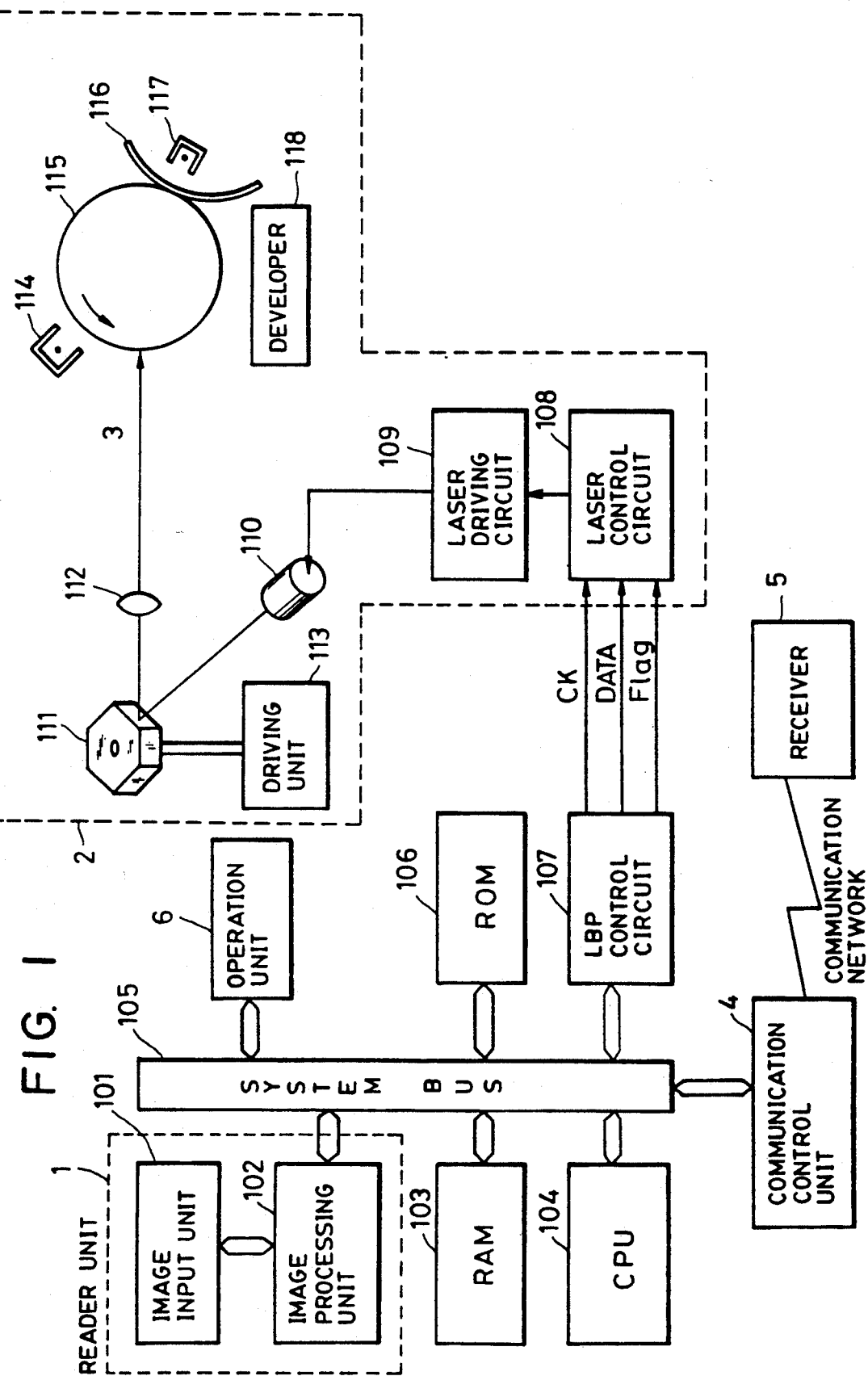
FIG. 1 is a block diagram showing a first embodiment of the present invention.

FIG. 1 is a block diagram showing the first embodiment of the present invention. In FIG. 1, a reader unit 1 comprises an image input unit 101 for reading an image of an original document, and an image processing unit 102 in which input image data are subjected to a quantization processing into binary data by an error diffusion method. A random access memory (RAM) 103 is used for image processing and as working areas for a CPU 104. The CPU 104 controls the reader unit 1 and an LBP recording unit which will be described later.

Control signals and image data in each block are transferred through a system bus 105. A read-only memory (ROM) 106 stores control programs which the CPU 104 executes. An LBP control circuit 107 controls the LBP by the control of the CPU 104.

An LBP recording unit 2 performs image formation according to data which are binary coded by the error diffusion method. The LBP recording unit 2 comprises a laser control circuit 108 for controlling the light power of a laser beam by controlling driving current, a laser driving circuit 109 for driving a laser by means of the driving current which is controlled by the laser control circuit 108, a laser light source 110 consisting of a semiconductor laser, a rotating polygonal mirror 111 for performing deflection scanning of the light beam on the surface of a photosensitive body 115, an imaging lens 112 for imaging the light beam on the surface of the photosensitive body 115, a driving unit 113 for driving the rotating polygonal mirror 111, and a corona charger 114, the photosensitive body 115, recording paper 116, a charger 117 for transfer and a developer 118 for visualizing a latent image formed on the photosensitive body 115 by laser beam 3. It is possible to control the size (diameter) of a resulting dot by means of controlling the driving current by the laser control circuit 108.

A communication control unit 4 performs control when the image processing unit 102 communicates binary-coded data by the error diffusion method, and comprises an image memory, a coding/decoding unit for coding and decoding data or a modulating-/demodulating unit of data, and the like. The communication control unit 4 is controlled by a communication program stored in the ROM 106.

A receiver 5 is connected to the communication control unit 4 via a communication network. The receiver 5 has an LBP recording unit as the LBP in the present embodiment has. An operation unit 6 is used for entering such information as the identity (name and/or telephone number) of communication correspondents and the like.

Figure 2:
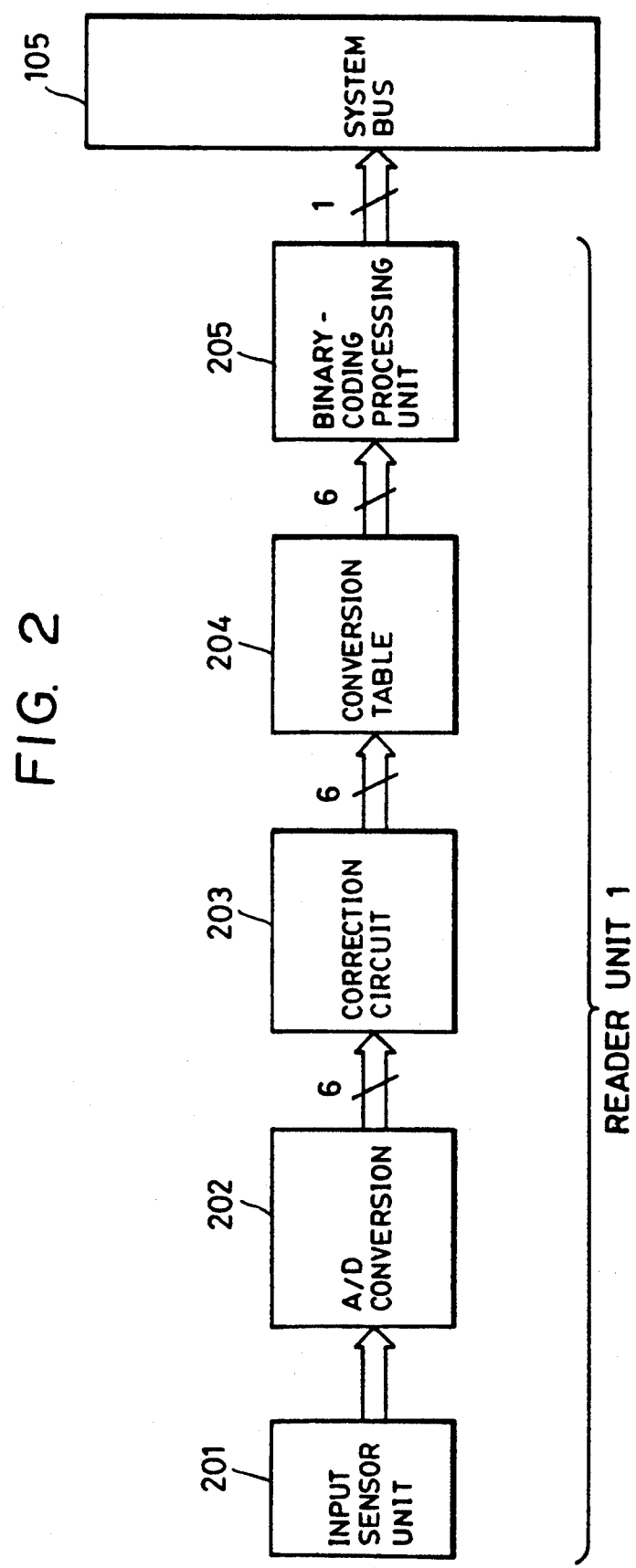
FIG. 2 is a block diagram showing the details of a reader unit 1 in FIG. 1.

FIG. 2 is a block diagram showing the detail of a reader unit 1 in FIG. 1.

An input sensor unit 201 comprises a photoelectric converter, such as a CCD or the like, and driving device for scanning the photoelectric converter, and performs read scanning of an original document.

An A/D converter 202 converts image data read by the input sensor unit 201 into digital signals having a quantization number of 6 bits. The number of gradations is thus 64 steps. Data 000000, for the lowest brightness, indicates the most dense black, and data 111111, for the highest brightness, indicates white.

Brightness data from the A/D converter 202 are sent to a correction circuit 203, where the correction of unevenness in sensitivity of the CCD and of shading distortion which is a distortion, in the light-distribution characteristic of the light source, is performed.

A conversion table 204 converts brightness data from the correction circuit 203 into density data, and comprises a ROM which outputs, corresponding to 6 bits of input brightness data, 6 bits of density data. In general, there is the relationship (density) = $-\gamma$ log (brightness) ($\gamma$: a positive constant) between brightness and density. Data according to this formula are written in the table 204. An example of the content of the conversion table is shown in FIG. 3.

In the correspondence table in FIG. 3, the input data values (brightness data) of 60 or more (white) are all set such that the output data values (density data) are set to 0. The output data $X_{i,j}$ is the density data [0 (white) − 63 (black)].

That is, with respect to the brightness data of 60 or more, in the case of performing the binarization using the error diffusion method by converting the density data to 0, an increase amount of the error data which is distributed to the peripheral pixels is also 0 in the portion having density data of 0. Therefore, by adding the error data, the value of the density data of certain pixels exceeds the threshold value, so that output of such spurious black dots can be prevented.

As described above, according to this embodiment, the brightness density conversion table is set before the binarizing process based on the error diffusion method and the brightness data of a predetermined value or more is set to the density data 0, so that the increase amount of the errors in the error diffusion method can be set to 0. The particle-like noise in the highlight portion can be reliably eliminated at a high speed.

On the other hand, by eliminating the particle-like noise in the highlight portion, the encoding process in the facsimile apparatus can be also efficiently executed.

A binary-coding processing unit 205 performs quantization processing of 6-bit density data sent from the conversion table 204 into a 1-bit binary signal by the error diffusion method.

Figure 4:
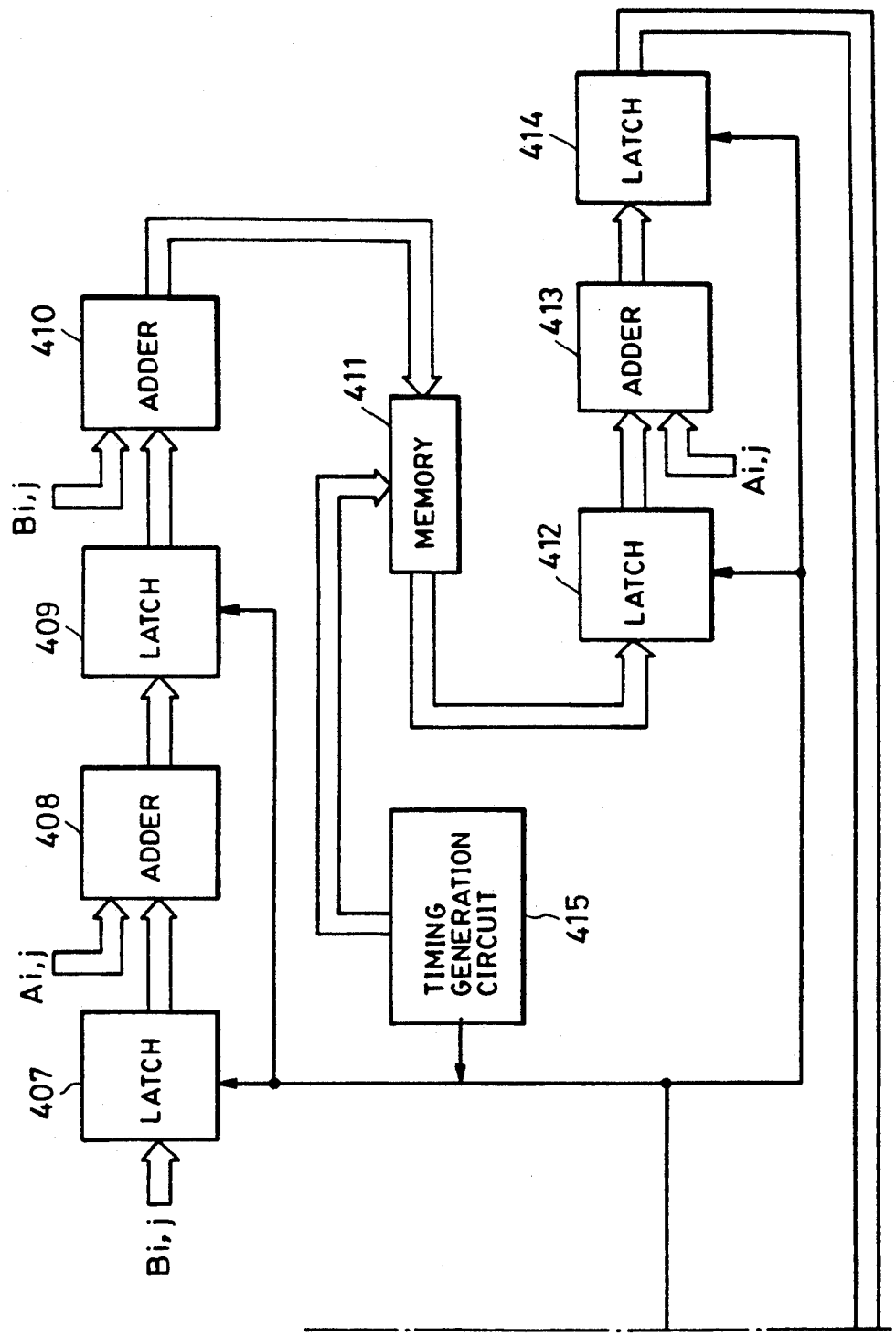
FIG. 4, which is divided into

FIG. 4 is a block diagram showing the detail of the binary-coding processing unit 205 in FIG. 2.

Data $X_{i,j}$ sent from the conversion table 204 is added by an adder 401, to error data $E_{i,j}$ from an adder 406 which have already been generated in the course of performing the binary coding processing. The data $D_{i,j}$ corrected by the error is represented by the following expression;

$$D_{i,j} = X_{i,j} + \overline{E}_{i,j}.$$

The data $D_{i,j}$ is binary-coded using the threshold T (T=32) in a comparator 402. That is, the binary-coded output $Y_{i,j}$ is represented as follows;

$$D_{i,j} \geq T - Y_{i,j} = 63$$

$$D_{i,j} < T - Y_{i,j} = 0.$$

The data $D_{i,j}$ is also sent to an error arithmetic unit 403. In the error arithmetic unit 403, an error $E_{i,j}$ to be distributed to surrounding picture elements is calculated according to the data $D_{i,j}$ and the binary-coded output $Y_{i,j}$. That is, the $E_{i,j}$ can be represented as follows;

$$E_{i,j} = D_{i,j} - Y_{i,j}.$$

The data $E_{i,j}$ is sent to an error-distribution-value arithmetic circuit 404, where values to be distributed to four picture elements surrounding a picture element in question are determined.

Figure 5:
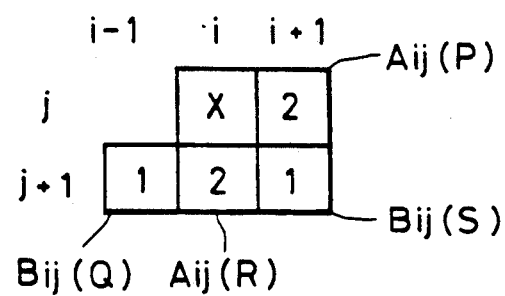
FIG. 5 is a diagram showing an example of a weighing matrix.

FIG. 5 is a diagram showing a weighting matrix, which indicates the positions and ratios of picture elements to which the error $E_{i,j}$ generated at the picture element X in question is distributed.

In the error-distribution-value arithmetic circuit 404, $A_{i,j}$ and $B_{i,j}$ in FIG. 5 are determined as follows;

$$A_{i,j} = 2 \times Int(E_{i,j} \times 1/6)$$

$$B_{i,j} = Int(E_{i,j} \times 1/6)$$

The error-distribution-value arithmetic circuit 404 is configured to truncate values to the right of the decimal point. That is, it is possible to execute only operations upon integers. "Int" represents that values to the right of the decimal point are truncated. By truncating values to the right of the decimal point, there is generated a surplus or difference $R_{i,j}$ between the error $E_{i,j}$ generated at the picture element in question and the $A_{i,j}$ and $B_{i,j}$ which have been computed at the error-distribution-value arithmetic circuit 404 and which are to be dispersed to the surrounding four picture elements. The difference $R_{i,j}$ is represented by the following expression;

$$R_{i,j} = E_{i,j} - 2 \times (A_{i,j} + B_{i,j}).$$

The difference $R_{i,j}$ is sent to a latch 405 to be delayed by one picture element, and added to input data $X_{i+1,j}$ of the next picture element.

For example, if it is assumed that the density $(X_{i,j})$ of the original image of the picture element in question is (34), and the sum $(\overline{E}_{i,j})$ of errors diffused from surrounding picture elements to the picture element in question is (−9), $D_{i,j}$ becomes 25. If the threshold value is assumed to be (32), the density of an output image becomes 0, and the error $E_{i,j}$ becomes $E_{i,j}=25$. Error values to be distributed to surrounding picture elements which are determined from $E_{i,j}=25$ according to the weighting matrix in FIG. 5 are calculated, for P which is picture element (i+1, j), as, $$A_{ij} = P = 2 \times Int(25 \times 1/6)$$
$$= 8; \text{ and}$$

for Q which is picture element (i−1, j+1), as, $$B_{ij} = Q = 1 \times Int(25 \times 1/6)$$
$$= 4.$$

Errors to be distributed to other picture elements can be described as follows;

$$\begin{cases} P = R \\ Q = S. \end{cases}$$

When the values of P, Q, R and S calculated above are added, $$E^* = P + Q + R + S$$
$$= 8 + 4 + 8 + 4$$
$$= 24.$$

This value is different from $E_{i,j}=25$, and the error value becomes smaller by 1.

In the case of the error diffusion method, if there is a difference between an error generated in a picture element in question and an error to be diffused to surrounding picture elements the density of the input image is not equal to the density of the output image, and the picture quality of the output image deteriorates. Hence, in the present embodiment, a surplus of the error generated as a result of operation, that is, 1 in the above-described example, is not truncated, and the surplus 1 is carried over when the picture element in question is shifted from (i,j) to (i+1,j).

The surplus is $R_{i,j}$ in FIG. 4.

On the other hand, the value $A_{i,j}$ is sent to adders 413 and 408 in order to be distributed to picture elements (i+1,j) and (i,j+1), respectively, and the value $B_{i,j}$ is sent to a latch 407 and an adder 410 in order to be distributed to picture elements (i+1,j+1) and (i−1,j+1), respectively.

A memory 411 is a memory for storing errors to be distributed to the j+1-th line, and can store error data of picture elements of at least one line.

A timing generation circuit 415 generates various kinds of signals, such as latch signals for latch circuits 405, 407, 409, 412 and 414, address signals for the memory 411 and the like.

Next, the method of distributing the above-described errors will be explained in more detail with reference to FIG. 6.

FIG. 6 is a diagram showing flows of binary-coding processing by the error diffusion method. First, if values weighted to an error generated at the picture element $X_1$ in question are represented by $P_1$, $Q_1$, $R_1$ and $S_1$, these values are dispersed to four surrounding picture elements as shown in FIG. 6(a). The $P_1$, $Q_1$ and $R_1$ and $S_1$ are sent to adders 413, 410 and 408, and a latch 407 in FIG. 4, respectively. The value $Q_1$ is written in address 1 of the memory 411.

Next, when the picture element in question is shifted to $X_2$, errors $P_2$, $Q_2$, $R_2$ and $S_2$ are dispersed to four surrounding picture elements as shown in FIG. 6(b). The value $P_2$ is sent to the adder 413. The value $Q_2$ is added to the $R_1$ generated at the $X_1$ in the adder 410, and written in address 2 of the memory 411. The value $R_2$ is added to $S_1$ generated at $X_1$ in the adder 408. The value $S_2$ is sent to the latch 407.

Next, when the picture element in question is shifted to $X_3$, errors $P_3$, $Q_3$, $R_3$ and $S_3$ are dispersed to four surrounding picture elements as shown in FIG. 6(c). The value $P_3$ is sent to the adder 413. The value $Q_3$ is added to $S_1$ generated at $X_1$ and $R_2$ generated at $X_2$ in the adder 410, and written in address 3 of the memory 411. $R_3$ is added to $S_2$ generated at $X_2$ in the adder 408. $S_3$ is sent to the latch 407.

When the above-described processing is performed for one line, the following values are written in the memory 411:

| | |
|---|---|
| address 1 in the memory | $M_1 = Q_1$ |
| address 2 in the memory | $M_2 = R_1 + Q_2$ |
| address 3 in the memory | $M_3 = S_1 + R_2 + Q_3$ |
| address 4 in the memory | $M_4 = S_2 + R_3 + Q_4$ |
| address i in the memory | $M_i = S_{i-2} + R_{i-1} + Q_i$ |

When the processing for one line has been completed and the processing proceeds to the next line, errors generated at the preceding line are read from the memory.

The errors read from the memory are added to an error generated at the preceding picture element in the adder 413 and output from the latch 414.

The reading of errors from the memory 411 is controlled by the timing generation circuit 415 so as to correspond to the preceding line. The timing generation circuit 415 controls so that, if the picture element in question is $X_i$, address $M_{i-3}$ in the memory 411 is read.

By means of performing the above-described processing for all input data, it is possible to perform a binary coding by the error diffusion method.

As explained above, according to the present embodiment, it is configured such that a surplus of an error generated when the error is dispersed with weighing in the error diffusion method is added to input image data of the next picture element. Hence, it is possible to prevent the deterioration of picture quality with a simple configuration, without performing a decimal point operation, which would require a large-scale hardware.

A comparator 416 in FIG. 4 determines to which among highlight signal, dark signal and half-tone signal the input picture signal $X_{i,j}$ belongs, and outputs a flag for respective signal.

That is, the comparator 416 compares $X_{i,j}$ with two threshold values $TD_1$ and $TD_2$ ($TD_1 < TD_2$),

| | |
|---|---|
| $X_{i,j} \leq TD_1$ | ∴ Flag = 0 (highlight signal) |
| $TD_1 > X_{i,j} > TD_2$ | ∴ Flag = 1 (half-tone signal) |
| $X_{i,j} \geq TD_2$ | ∴ Flag = 2 (dark signal) | and outputs a flag in accordance with each gradation level.

Next, the recording processing when image data binary-coded in the reader unit 1 in FIG. 1 are recorded at the LBP recording unit 2 will be explained.

By the control of the CPU 109, the LBP control circuit 107 transfers binary image data Data from the image processing unit 102, a density flag Flag (417) and a clock signal Ck to the laser control circuit 108.

In the present embodiment, the light-beam diameter is changed in accordance with each content of Flag. As means for this purpose, a method for changing driving current is used.

Figure 7:
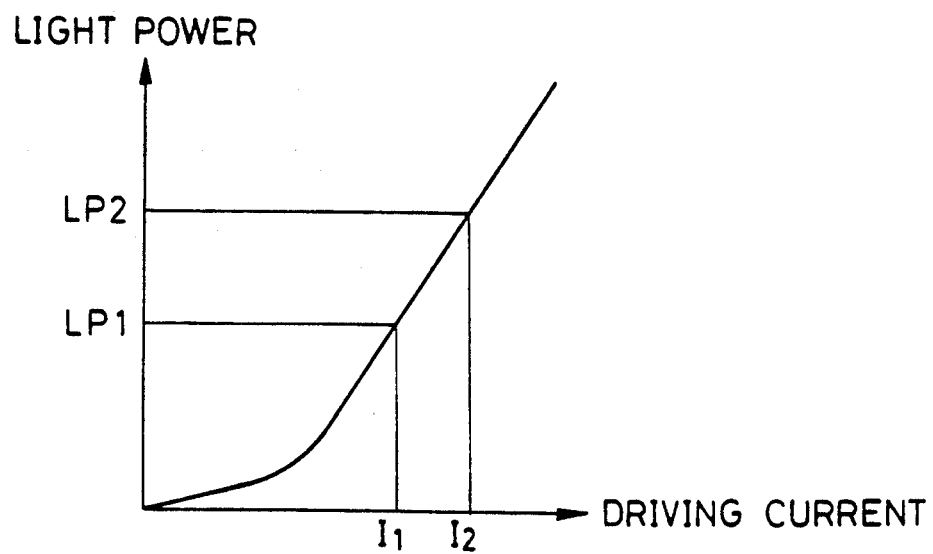
FIG. 7 is a diagram showing a relationship between driving current and light power of a semiconductor laser 110.
Figure 8:
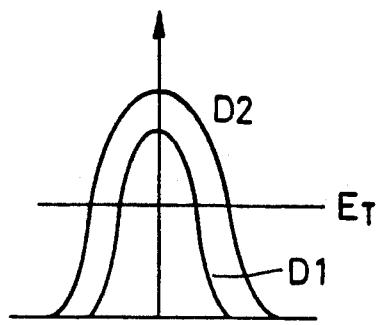
FIG. 8 is a diagram showing energy distributions of a laser light.

FIG. 7 shows a relationship between drive current and light power of a semiconductor laser 10.

In the present embodiment, in the case of Flag=0 (a high-contrast picture-element density), the driving current is $I_1$ and the light power is $LP_1$.

In the case of Flag=2 (a dark picture-element density), the driving current is $I_2$ and the light power is $LP_2$.

In the case of Flag=1 (a half-tone picture-element density), the driving current is randomly selected between $I_1$ and $I_2$.

Since the laser light has a Gaussian energy density distribution, the light-power density distribution becomes $D_2$ when the driving current is increased from that for the light-power density distribution $D_1$. When the amount of exposure necessary for recording on the photosensitive body is represented by $E_r$, the diameter of a recording dot on the photosensitive body is varied according to the driving current.

The diameter of a recording dot r is expressed by $$r = a \sqrt{\ln(P_0/bE_r)},$$

where $P_o$ is the output of the laser light, and a and b are constants.

The driving current is converted into a light beam by the laser light source 110, and the emitted light beam performs deflection scanning on the surface of the photosensitive body 115 by the rotating polygonal mirror 111. The imaging lens 112 images the light beam on the surface of the photosensitive body 115.

After the photosensitive body 115 has been charged by the corona charger 114, the light beam 3 projects an image on the photosensitive body 115 to form an electrostatic latent image.

The electrostatic latent image is visualized by the developer 118, and transferred to the recording paper 116 by the transfer charger 117.

Figure 9:
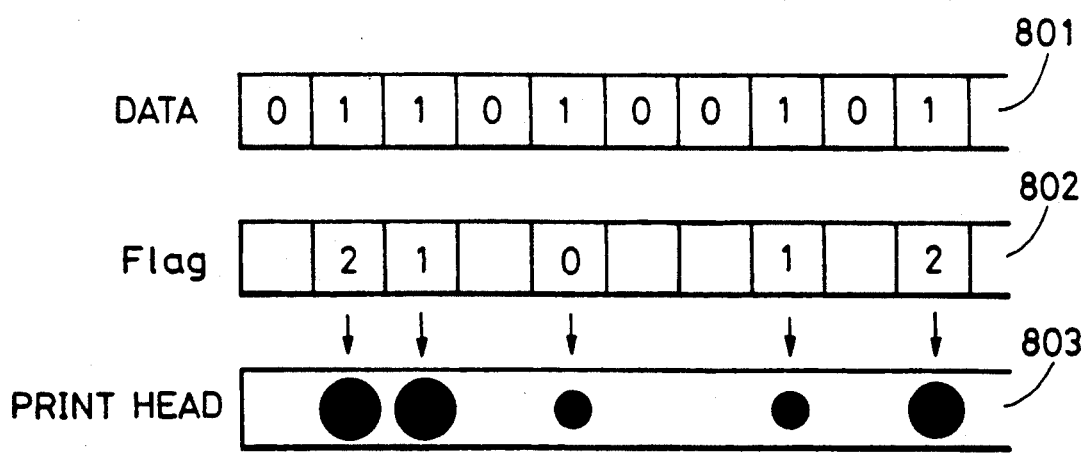
FIG. 9 is a diagram showing the sizes of dots which are determined by binary data and density data.

FIG. 9 is a diagram showing the sizes of printed dots which are controlled in accordance with data 801 which have been binary coded by the error diffusion method and the content 802 of Flag which indicates the density of an input image. That is, when the value of the binary-doded data 801 is 1 (dot "on") and the content of the Flag 802 is 2 (a dark portion), the size of a printed dot becomes large, and when the value of the binary-coded data 801 is 1 and the content of the Flag 802 is 0

(a highlight portion), the size of a printed dot becomes small.

When the value of the binary-coded data 801 is 1 and the content of the Flag 802 is 1 (half-tone portion), the size of a printed dot is switched between large and small.

FIG. 10 shows a recording example using the dot sizes shown in FIG. 9.

Figure 10A:
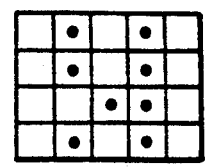
FIG. 10 consisting of FIGS. 10(a), 10(b) and 10(c), is a diagram showing examples of printing in the first embodiment.

FIG. 10(a) shows a highlight portion of an output image, in which a connection between dots is prevented because the dot size is small. That is, the generation of a unique striped pattern in the error diffusion method can thereby be prevented.

Figure 10B:
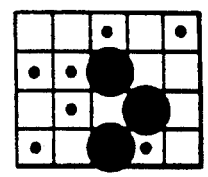

FIG. 10(b) shows a half-tone portion of the output image. In this case, a connection between dots can be prevented by printing small dots, and thus it is possible to prevent the generation of the mentioned unique striped pattern in the error diffusion method. In this case, moreover, since two kinds, that is, large and small, of dot sizes are printed with switching, it is possible to provide gradation in the half-tone portion.

Figure 10C:

FIG. 10(c) shows a dark portion of the input image. In this case, since large dots are printed, it is possible to prevent the generation of white spaces between dots.

As described above, according to the first embodiment of the present invention, by changing the size of a printed dot in accordance with the density of an input image, it is possible to prevent the generation of a unique striped pattern in the error diffusion method in highlight and half-tone portions of an image, and further to prevent the generation of white spaces in dark portions of the image.

Further, according to the first embodiment, the brightness density conversion table is set before the binarizing process based on the error diffusion method and the brightness data of a predetermined value or more is set to the density data 0, so that the increase amount of the errors in the error diffusion method can be set to 0. The particle-like noises in the highlight portion can be certainly eliminated at a high speed.

On the other hand, by eliminating the particle-like noises in the highlight portion, the encoding process in the facsimile apparatus can be also efficiently executed.

Furthermore, as shown in FIG. 1, it is possible to send binary data and a flag indicating the density level of an image to the receiver 5 via the communication control unit 4.

When data are sent to an apparatus in communication, the CPU 104 performs control in accordance with transmission instruction from the operating unit 6.

The receiver 5 is provided with a recording unit having the same configuration as that of the LBP recording unit 2. This recording unit performs recording controlling the size of the diameter of a dot according to binary data and a flag which have been sent.

Although, in the first embodiment, the density of a picture element in question is divided into three density levels and the diameter of a printed dot is changed in accordance with each density level, a striped pattern which is unique in the error diffusion method can also be reduced by the following methods.

(i) The diameter of a dot is randomly changed irrespective of the density level.

(ii) The diameter of a dot which is smaller than the standard diameter of a dot is used for a picture element having a high-contrast density, and the density of a dot is randomly changed for other density levels.

(iii) The standard diameter of a dot is used for a picture element having a dark density, and the diameter of a dot is randomly changed for other density levels.

(iv) The diameter of a dot which is smaller than the standard diameter of a dot is used only for a picture element having a high-contrast density.

(v) The standard diameter of a dot is used only for a picture element having a dark density.

It is to be noted that the standard diameter of a dot can be obtained by the standard driving current.

Second Embodiment

The above-described first embodiment has a configuration in which the size of a printed dot in the LBP recording unit is controlled in accordance with binary data and a flag indicating the density level of an image.

A second embodiment which will be described below has a configuration in which a printer using a thermal head (a thermal-head printer, THP), such as a printer for recording on heat-sensitive recording paper or a printer using a heat-transfer method and the like, is used instead of the LBP in the first embodiment.

Figure 11:
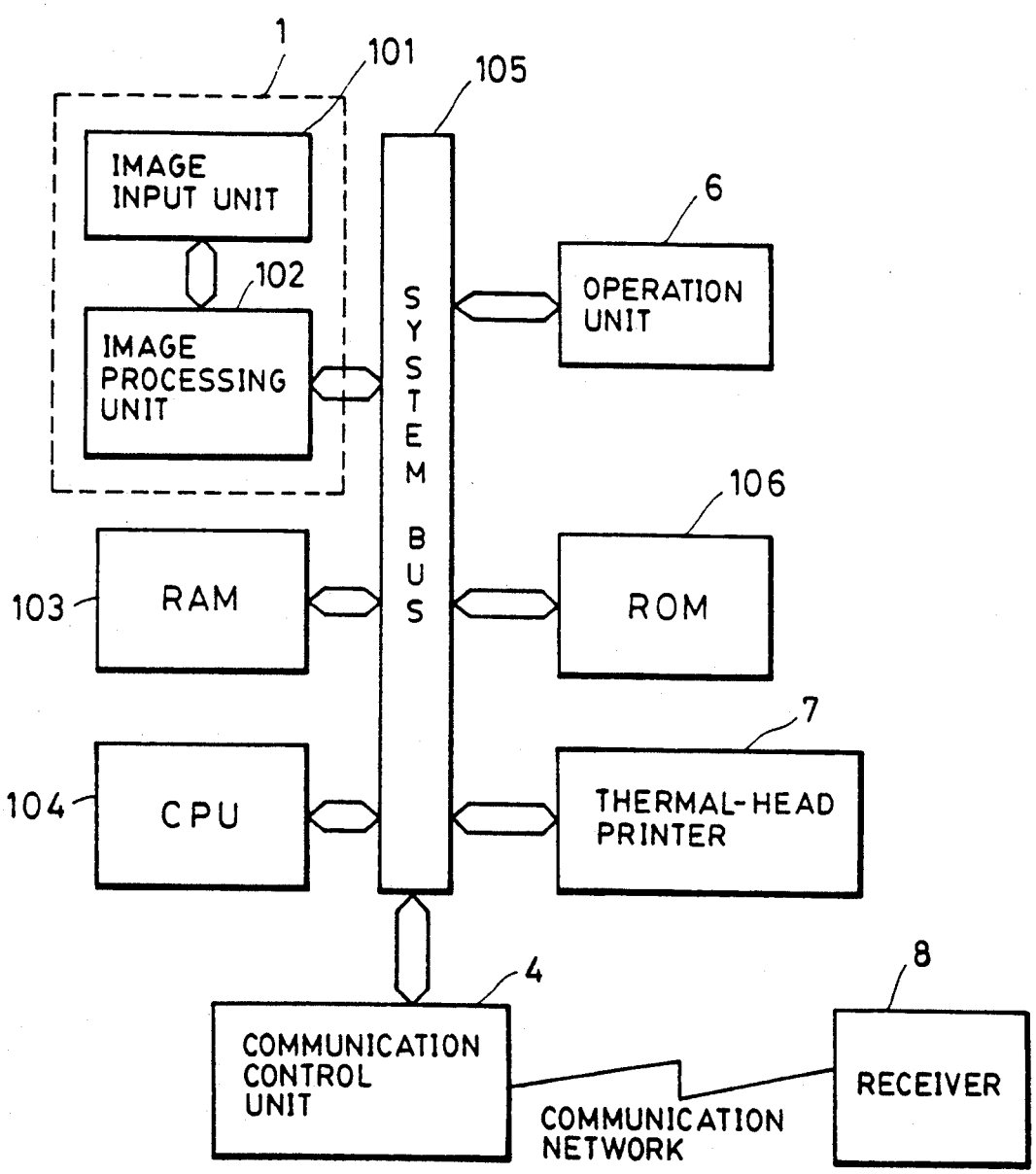
FIG. 11 is a block diagram showing second embodiment of the present invention.

FIG. 11 is a block diagram showing the second embodiment. In FIG. 11, components indicated by like numerals as those in FIG. 1 have identical configurations, and explanation thereof will be omitted.

A thermal-head printer 7 performs switching of the driving electric power for heating resistors used as a thermal head according to data which have been binary coded by the error diffusion method in the reader unit 1, and thereby forms an image by either coloring heat-sensitive paper or transferring ink of an ink ribbon to ordinary paper by turning on the power.

A receiver 8 includes a thermal-head printer unit.

It is to be noted that, in the second embodiment, the comparator 416 in FIG. 4, which indicates the detail of the binary-coding processing unit 205 in the reader unit 1 (FIG. 2), is unnecessary.

Figure 12:
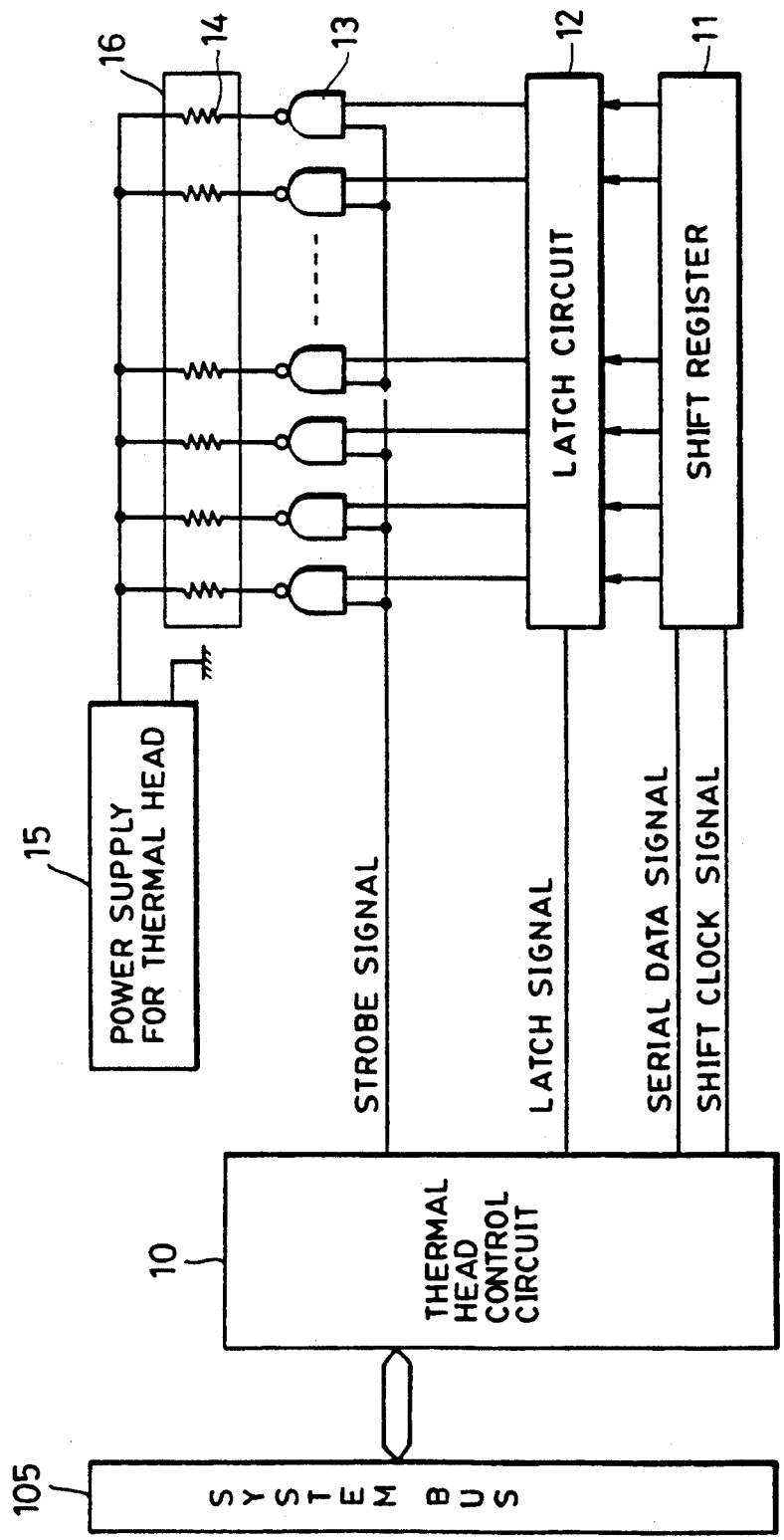
FIG. 12 is a block diagram showing the detail of a thermal-head printer.

FIG. 12 shows the detail of the thermal-head printer 7.

A thermal head control circuit 10 controls the thermal head by the control of the CPU 104.

A shift register 11 converts serial data which are binary data sent from the thermal head control circuit 10 into parallel data. A latch circuit 12 temporarily stores data converted into parallel data in the shift register 11. There are also shown a driver circuit 13, heating resistors 14, a power supply circuit 15 for the thermal head for supplying a driving electric power to heating resistors 14, and a ceramic substrate 16 which includes the heating resistors 14.

Now, the operation will be hereinafter explained.

The thermal head control circuit 10 transfers binary data which have been binary coded in the reader unit 1 to the shift register 11 as serial data signals.

The shift register 11 stores data for one line, and sends the data to the latch circuit 12 as parallel data. The latched data for one line are sent to the driver circuit 13 by a latch signal from the thermal head control circuit 10. The driver circuit 13 forms the AND of the binary data from the latch circuit 12 and a printing-strobe-width signal (for example, 0.4 msec) from the control circuit 10, and heats the heating resistors 14 on the ceramic substrate 16.

By repeating the above-described operation for plural lines, it is possible to record data which have been binary coded by the error diffusion method using the thermal-head printer.

A recorded example by a thermal-head printer is shown in FIG. 13.

FIG. 13(a) shows a dark portion in which the number of black picture elements 1 after binary-coding processing is large, and FIG. 13(b) is a diagram in which the binary data in FIG. 13(a) are recorded.

FIG. 13(c) shows a highlight portion in which the number of black picture elements 1 after binary-coding processing is small, and FIG. 13(d) is a diagram in which the binary data in FIG. 13(c) are recorded.

As is apparent from FIG. 13, in the case of a thermal-head printer, the diameter of a printed dot becomes large in the case of a dark portion in which there are many black dots in surrounding picture elements, and the diameter of a printed dot becomes small in the case of a highlight portion in which there are few black dots. This is caused by the following reason. Since the thermal-head printer performs printing operation by temperature rise and cooling of the head, a printed dot becomes large due to the heat-storage effect of the head when black dots are continuously printed. On the contrary, since the head is cooled in the case of few black dots (in the case of many whites), the temperature of the head does not reach the heating temperature for the standard printing even if energy is supplied to the head, and so the diameter of a printed dot becomes small.

That is, in the first embodiment, the diameter of a printed dot is changed by controlling the laser driving current of the laser-beam printer, while in the case of using a thermal-head printer, it is possible to change the diameter of a printed dot by utilizing the heat-storage effect of the head.

That is, since the diameter of a dot beomes large in a dark portion as shown in FIG. 13(b), it is possible to prevent the generation of white spaces between dots.

Moreover, since the diameter of a dot becomes small in a highlight portion as shown in FIG. 13(d), it is possible to prevent a connection of dots, and so prevent the generation of a unique striped pattern in the error diffusion method.

As shown in FIG. 11, it is possible to transmit binary data which have been binary-coded by the error diffusion method to the receiver 8 via the communication control unit 4. In this case, since it is not necessary to transmit a flag indicating the density level of an image as in the first embodiment, it is possible to increase communication efficiency.

When data are sent to an apparatus in communication, the CPU 104 performs control in accordance with a transmission instruction from the operating unit 6.

The receiver 8 is provided with a recording unit having the same configuration as that of the thermal-head printer 7, and the recording unit controls the thermal head according to binary data which have been sent to perform recording.

As explained above, according to the second embodiment, by means of recording binary data which have been binary coded by the error diffusion method by a thermal-head printer, it is possible to control the size of the diameter of a dot in accordance with the denity of an image.

It is possible thereby to prevent the generation of a unique striped pattern in the error diffusion method in highlight portions, and also to prevent the generation of white spaces between dots in dark portions, and thus to reproduce an excellent image.

Further, according to the second embodiment, as well as the first embodiment, the binarizing process is based on the error diffusion method and the brightness data of a predetermined value or more is set to the density data 0, so that the increase amount of the errors in the error diffusion method can be set to 0.

The particle-like noise in the highlight portion can be reliably eliminated at a high level.

On the other hand, by eliminating the particle-like noise in the highlight portion, the encoding process in the facsimile apparatus can be also efficiently executed.

Although, in the present embodiment, a case in which image data are subjected to a binary-coding processing has been explained, the present invention can also be used in a case in which image data are subjected to a multiple-number-coding processing.

Furthermore, although, in the first embodiment, a case in which the size of the diameter of a dot is controlled by a laser-beam printer, it is also possible to control the size of the diameter of a dot by controlling an ink-discharge amount in an ink jet printer.

As explained above, according to the second embodiment of the present invention, by outputting image data which have been quantized by the error diffusion method, using a thermal-head printer, it is possible to provide an image processing method and apparatus which can reproduce or communicate an excellent image having a high resolution with a simple configuration.

Figure 14B:
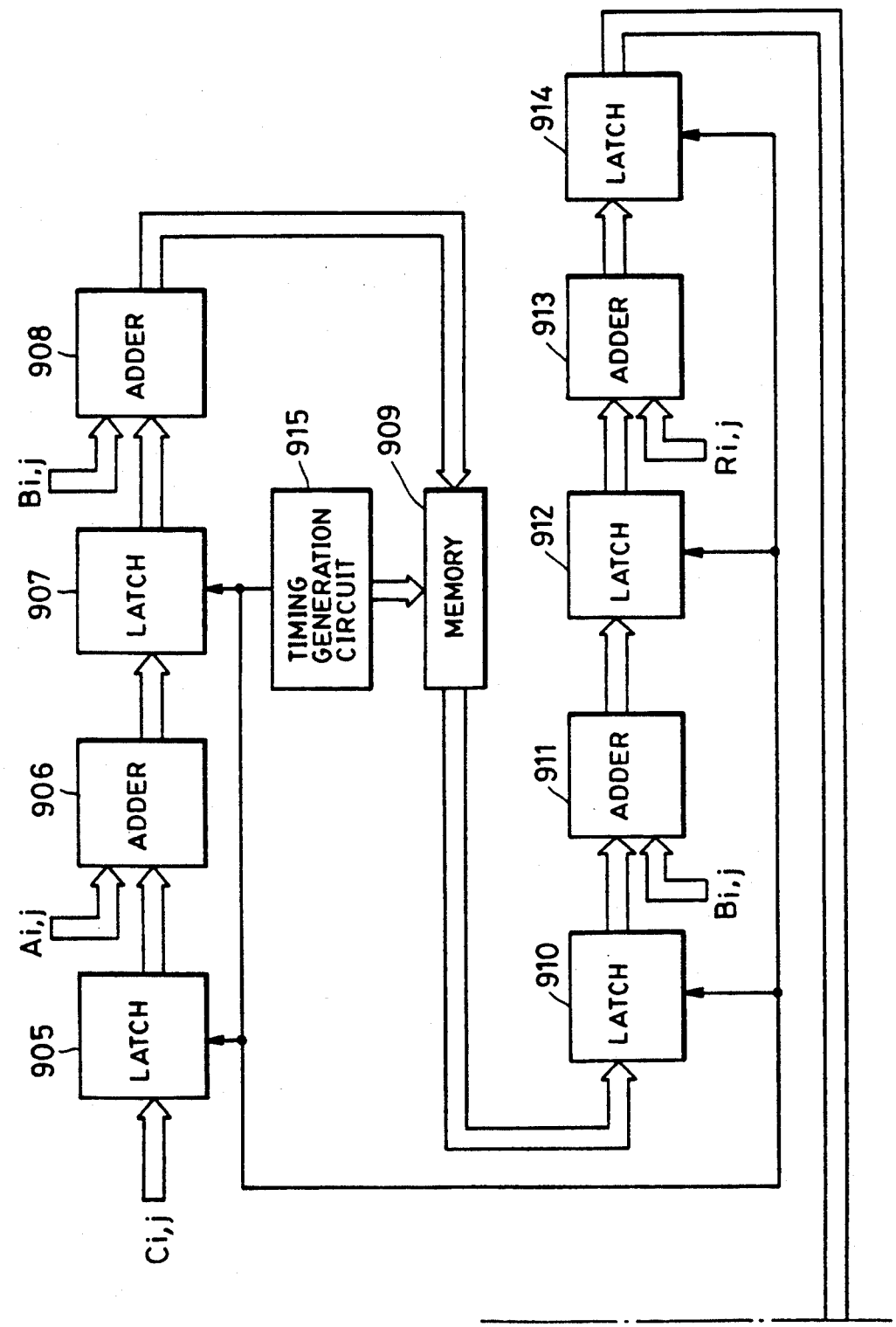

Next, an embodiment when the binary-coding processing unit in FIG. 2 is partially modified is shown in FIG. 14.

In FIG. 14, the comparator 416 shown in FIG. 4 is omitted.

An adder 901 adds error values to the density of an original picture element. A comparator 902 converts multivalued data into binary data by a threshold value. An error arithmetic circuit 903 calculates an error generated in a picture element in question. An error-distribution-value arithmetic circuit 904 calculates error values to be distributed to surrounding picture elements according to a weighing matrix. There are also shown latch circuits 905, 907, 910, 912 and 914, adders 906, 908, 911 and 913, a memory 909 for storing error values, and a timing generation circuit 915 for providing a timing for a latch 907 and latch circuits 905, 907, 910, 912 and 914.

The output data $X_{i,j}$ from the conversion table 204 in FIG. 2 and the data $E_{i,j}$ from the latch 914 are added in the adder 901, and an output $D_{i,j}$ is obtained.

That is, $D_{i,j} = X_{i,j} + E_{i,j}$, where $E_{i,j}$ is error data to be added to the picture element (i,j) in question. The corrected density $D_{i,j}$ of the picture element (i,j) in question is binary-coded by the comparator 902, and is output as binary-coded data $Y_{i,j}$.

| $D_{i,j} \geq T$ | $\therefore Y_{i,j} = 63$ |
|---|---|
| $D_{i,j} < T$ | $\therefore Y_{i,j} = 0.$ |

The printer performs on (black)/off (white) of a dot according to the value of the binary-coded data $Y_{i,j}$. That is, the printer prints a white when the input signal is 0, and a black when the input signal is 63.

The data $D_{i,j}$ of the picture element (i,j) in question after correction are sent to the error arithmetic unit 903. The error arithmetic unit 903 computes an error value which is generated when the picture element (i,j) in question is binary-coded. That is, the error $E_{i,j}$ can be expressed as follows;

$$E_{i,j} = D_{i,j} - Y_{i,j}.$$

Figures 15, 16:
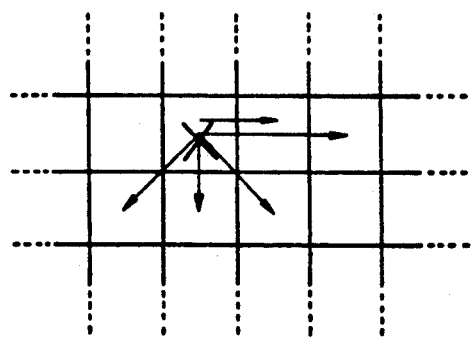
FIG. 15 is a diagram showing a weighing mask used in the binary-coding processing unit in FIG. 14.
FIG. 16 is a diagram showing positions of the error distribution which is performed in the binary-coding processing unit in FIG. 14.

The error $E_{i,j}$ is distributed to five picture elements surrounding the picture element (i,j) in question, according to a weighting matrix shown in FIG. 15. In FIG. 15, (i+1,j) is a picture element to which a surplus of the error is allocated as described below.

In order to calculate these distribution amounts, the error $E_{i,j}$ is sent to the error-distribution-value arithmetic circuit 904. An example of distribution of the value of the density $X_{i,j}$ of the picture element in question to surrounding five picture elements is shown in FIG. 16.

The operation performed in the error-distribution-value arithmetic unit 904 will be explained illustrating a numerical example. If it is assumed that the density $X_{i,j}$ of the original image of the picture element in question is (34), and the sum of errors diffused from surrounding picture elements to the picture element in question is $\overline{E}_{i,j} = -5$, the density $D_{i,j}$ of the picture element after correction becomes $D_{i,j} = 34 + (-5) = 29$. If it is assumed that the threshold value is T=32, the density of the output image becomes $Y_{i,j} = 0$, and an error $E_{i,j}$ generated at (i,j) becomes $$\begin{aligned} E_{i,j} &= 29 - 0 \\ &= 29. \end{aligned}$$

The sum of weightings of the weighing matrix in FIG. 15 exclusive of (i+1,j) becomes 8 from $$\begin{cases} (i+2,j) \rightarrow 1 \\ (i-1,j+1) \rightarrow 1 \\ (i,j+1) \rightarrow 4 \\ (i+1,j+1) \rightarrow 2. \end{cases}$$

In a digital operation, a division by the divisor 8 can be realized by taking the upper 3 bits of the dividend as the quotient. The lower 3 bits becomes a remainder surplus.

When distribution values for $E_{i,j} = 29$ are calculated according to the weighting matrix in FIG. 15, for picture element $(i, j+1)$, $$\begin{aligned} A_{i,j} &= 4 \times Int(29 \times 1/8) \\ &= 12, \end{aligned}$$

for picture element $(i+2, j), (i+1, j+1)$, $$\begin{aligned} B_{i,j} &= 1 \times Int(29 \times 1/8) \\ &= 3, \text{ and} \end{aligned}$$

for picture element $(i+1, j+1)$, $$\begin{aligned} C_{i,j} &= 2 \times Int(29 \times 1/8) \\ &= 6. \end{aligned}$$

The surplus is the lower 3 bits of $E_{i,j}$, that is, $R_{i,j} = 5$. In the present embodiment, $R_{i,j}$ is carried over to picture element (i+1,j). The weighting coefficient for (i+1,j) is 0.

The $A_{i,j}$, $B_{i,j}$, $C_{i,j}$ and $R_{i,j}$ enter into the adder 906, the adders 908 and 911, the latch 905 and the adder 913, respectively.

The memory 909 is used for storing error values for the (j+1)-th line.

Since the distribution processing of errors is nearly identical as that in the case of FIG. 6, an explanation thereof will be omitted.

By repeating the above-described processing for plural lines, it is possible to realize a binary-coding processing by the error diffusion method.

As described above, according to the second embodiment shown in FIG. 14, when realizing the error diffusion method by hardware, it is possible to provide a circuit with a simple configuration without a deterioration in picture quality, without using a decimal-point arithmetic circuitry which is large-scale hardware.

Moreover, by allocating a surplus to neighboring picture elements which have a high correlation with a picture element in question, it is possible to prevent a decrease in resolution.

Although the surplus $R_{i,j}$ is allocated to picture element (i+1,j) adjacent to the picture element (i,j) in question in FIG. 15, a similar effect may also be obtained by allocating the surplus to picture element (i+2,j) as

|       | i − 1 | i | i + 1 | i + 2 |
|-------|-------|---|-------|-------|
| j     |       | x | 1     | □     |
| j + 1 | 1     | 4 | 2     |       |

Third Embodiment

A connection of dots is prevented in the first embodiment by a configuration in which the size of a printed dot in an LBP recording unit is controlled in accordance with a flag indicating the density level of an image, and in the second embodiment by a configuration in which a thermal-head printer is used instead of the LBP.

In a third embodiment which will be hereinafter explained, the generation of a striped pattern (a connection of dots) which causes a deterioration in picture quality in the error diffusion method is further reduced and so an excellent image is reproduced, by using a thermal-head printer in a recording unit and controlling the size of a printed dot.

The third embodiment of the present invention will be hereinafter explained in detail with reference to the drawings.

Figure 17B:
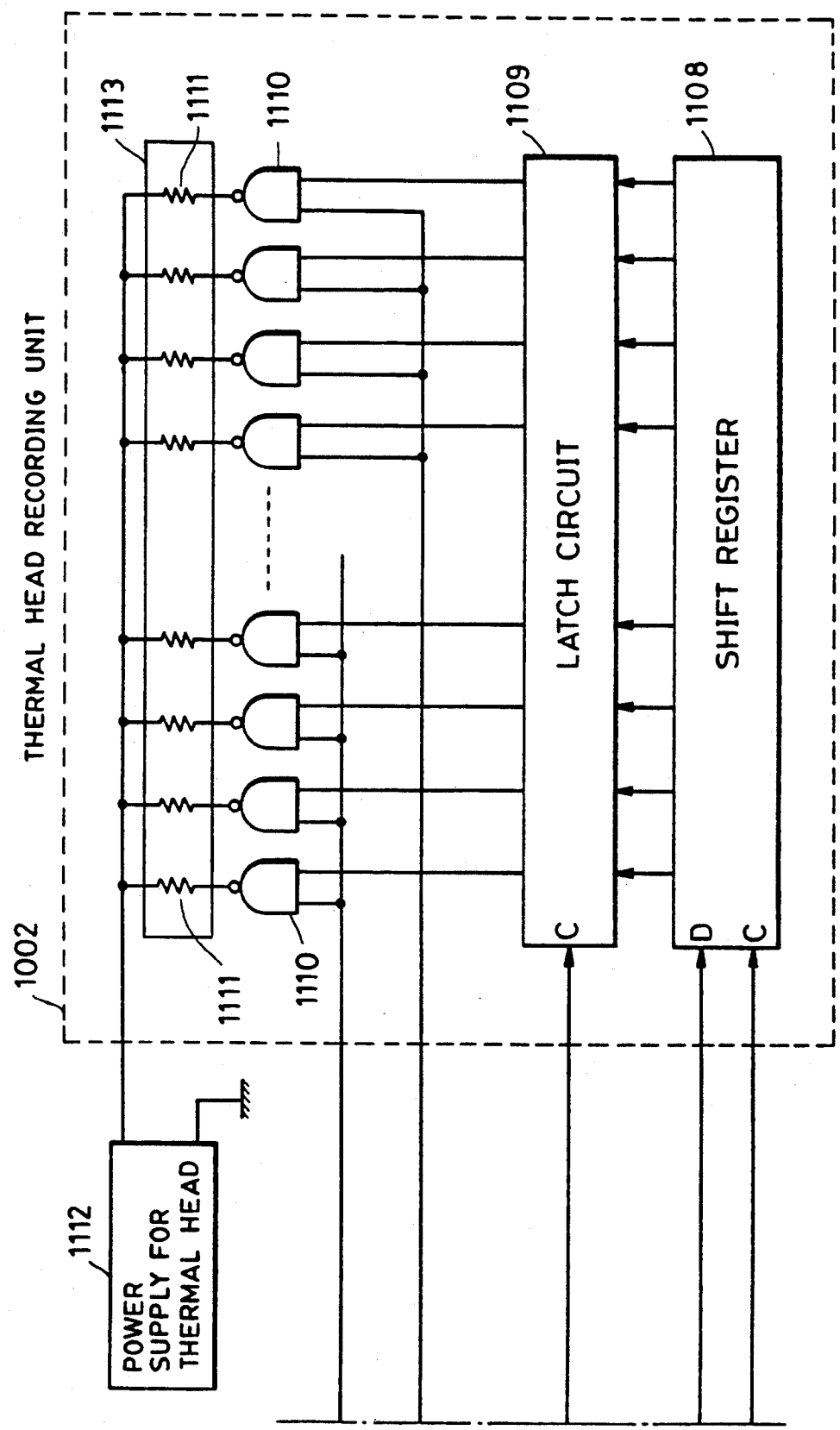

FIG. 17 is a block diagram showing the third embodiment of the present invention. In FIG. 17, a reader unit 1001 comprises an image input unit 1104 for reading an image of an original document and an image processing unit 1105 for performing a quantization processing of input image data into binary data using the error diffusion method. A random access memory (RAM) 1102 is used for image processing and as working areas for a CPU 1101. The CPU 1101 controls the reader unit 1001 and a thermal head recording unit 1002 which will be described later.

Control signals and image data in each block are transferred through a system bus 1103. A read-only memory (ROM) 1106 stores control programs which the CPU 1101 executes. A thermal head control circuit 1107 controls the thermal head recording unit 1002 by the control of the CPU 1101.

The thermal head recording unit 1002 performs image formation according to data which are binary coded by the error diffusion method.

A shift register 1108 converts serial data which are binary data sent from the thermal head control circuit 1107 into parallel data. A latch circuit 1109 temporarily stores data converted into parallel data in the shift register 1108. There are also shown a driver circuit 1110, heating resistors 1111, a power supply circuit 1112 for the thermal head for supplying driving electric power to heating resistors 1111, and a ceramic substrate 1113 which includes the heating resistors 1111.

In FIG. 17, the reading unit 1001 has a configuration which is entirely identical as that shown in FIG. 2, and an explanation of each component will be omitted.

Figure 18B:
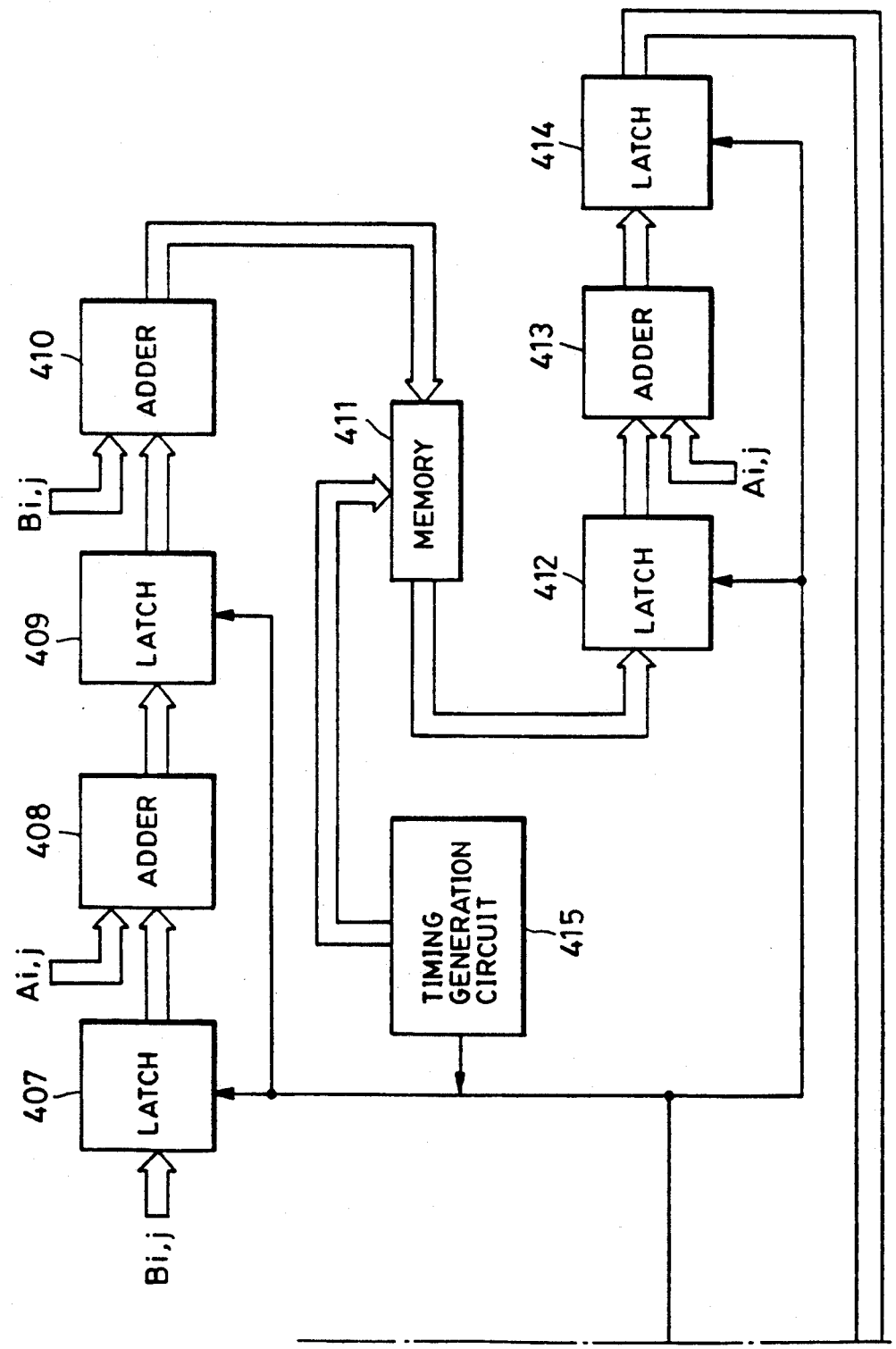

FIG. 18 is a block diagram showing the detail of a binary-coding processing unit (205 in FIG. 2) of the reader unit 1001 in FIG. 17.

Since the configuration of FIG. 18 is identical as that of FIG. 4 except that the comparator 416 in FIG. 4 is removed, like components are indicated by like numerals and an explanation thereof will be omitted. A weighting matrix used in the error-distribution-value arithmetic circuit 404 is also identical as that shown in FIG. 5.

It is possible to perform binary coding using the error diffusion method by using a binary-coding circuit shown in FIG. 18.

The processing when image data which have been binary coded in the image processing unit 1105 shown in FIG. 17 are recorded in the thermal head recording unit 1002 shown in FIG. 17 will be hereinafter explained.

FIG. 19 is a flow chart showing a recording processing procedure. The flow chart is stored in the ROM 1106, and the CPU 1101 executes the flow chart. First, the process proceeds to step S1, where a parameter $t_1$, for example 0.3 msec, is set in a printing-strobe-width determination circuit of the thermal head control circuit 1107.

A strobe width represents a current-passing time for heating resistors 1111. Strobe signals (1)—(N) in FIG. 17 are used for driving 1/N driver circuits among driver circuits 1110 for one line, respectively. For example, when there are 2048-bit driver circuits for one line and strobe signals are (1)-(4), each strobe signal is used for driving driver circuits for 512 bits.

At step S2, 2048-bit (one-line) binary data $(DATA)_1$ and data $(DATA1)_1$ which are the logical product of random numbers of 2048 bits are transferred to the shift register 1108. That is, $(DATA1)_1$ is represented by the following expression:

$$(DATA1)_1 = (DATA)_1 \text{ AND}(001 \text{---} 1100)$$
$$\text{binary data} \quad \text{random number } (00r1).$$

This operation is performed in the thermal head control circuit 1107. A random number generation circuit generates a pulse train each pulse of which is 0 or 1 and which is synchronized with 1 bit of $(DATA)_1$.

At step S3, the data $(DATA1)_1$ in the shift register 1108 is latched in a latch circuit 1109.

At step S4-1, strobe signal (1) having a pulse width $t_1$ (0.3 msec in this case) is switched on, and thereby each corresponding heating resistor 1111 is heated once when the value of the data latched in the latch 1109 is 1. Heat-sensitive paper is thereby colored. By repeating this operation up to strobe signal (N), a first recording for one line is completed.

At step S5, a parameter $t_2$ ($t_2=0.4$ msec) is then set in the printing-strobe-width determination circuit of the thermal head control circuit 1107 in order to perform a second printing on the same line.

At step S6, the above-described binary data $(DATA)_1$ for one line are again read from the RAM 1102 and transferred to the shift register 1108. The $(DATA)_1$ have been written in the RAM 1102 at the first recording.

At step S7, the data $(DATA1)_1$ in the shift register 1108 are latched in the latch circuit 1109.

At step S8, strobe signal (1) having a pulse width $t_2$ ($t_2=0.4$ msec) is switched on, and each corresponding heating resistor 1111 is heated once. By repeating this operation up to strobe signal (N), the second recording processing for one line is completed. An example of an appearance of the printing in which one line has been printed twice is shown in FIG. 20.

Now, as shown in FIG. 20, a case in which 10-bit (DATA) 1201 are printed will be investigated.

First, the logical product of a pulse train 1202 consisting of random numbers of 0 or 1 and the (DATA) 1201 is obtained to make it DATA1 1203.

When printing is then performed with a strobe width of $t_1=0.3$ msec, black dots on paper are formed like dots 1204.

Since the energy provided by the strobe width $t_1$ is smaller than the energy to be originally provided, the size of the dot becomes smaller than the size of a proper dot.

Next, DATA 1201 are printed with a strobe width of $t_2=0.4$ msec at a position which is identical as that where (DATA1) 1203 have originally been printed. As a result, black dots on the paper are formed like dots 1205.

That is, two dot sizes, i.e., black dots (DOT1) printed by both $t_1$ and $t_2$ and black dots (DOT2) printed only by $t_2$, randomly appear on the paper. The relationship between the two sizes is as follows:

(DOT1)>(DOT2).

The dot size becomes larger when printing is performed twice, because the heat from the first recording remains in the heating resistors.

By repeating the above-described processing for plural lines, it is possible to form an image by changing the sizes of dots.

Figure 21:
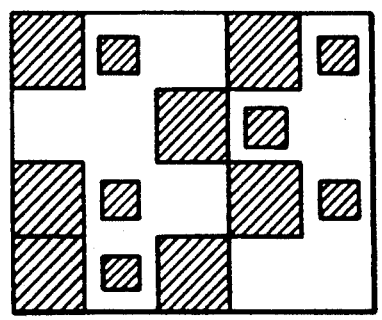

According to the present embodiment, it is possible to prevent connection of dots, since the dot size is switched between large and small. An appearance of this type of printing is shown in FIG. 21.

By thus preventing connection of dots, it is possible to prevent the generation of a unique striped pattern in the error diffusion method. However, in the above-described embodiment, although it is possible to prevent the generation of a striped pattern in highlight or half-tone portions of an image, there occur white spaces due to the fact that dots become small in dark portions of an image.

Hence, in the following embodiment, a case in which the size of a dot is switched in accordance with the density of an image will be explained.

In this case, it is possible to perform the binary-coding processing performed in the image processing unit 1105 in FIG. 17 in the binary-coding processing unit shown in FIG. 4.

In FIG. 4, a comparator 416 determines to which among highlight signal, dark signal and half-tone signal the input image signal $X_{i,j}$ belongs, and outputs a flag for each signal.

That is, the $X_{i,j}$ is compared with two threshold values TD1 and TD2 (TD1 < TD2)

| | |
|---|---|
| $X_{i,j} \leq TD1$ | ∴ Flag = 0 (highlight signal) |
| $TD1 > X_{i,j} > TD2$ | ∴ Flag = 1 (half-tone signal) |
| $X_{i,j} \geq TD2$ | ∴ Flag = 2 (dark signal). | and outputs a flag corresponding to each gradation level.

Figure 22:
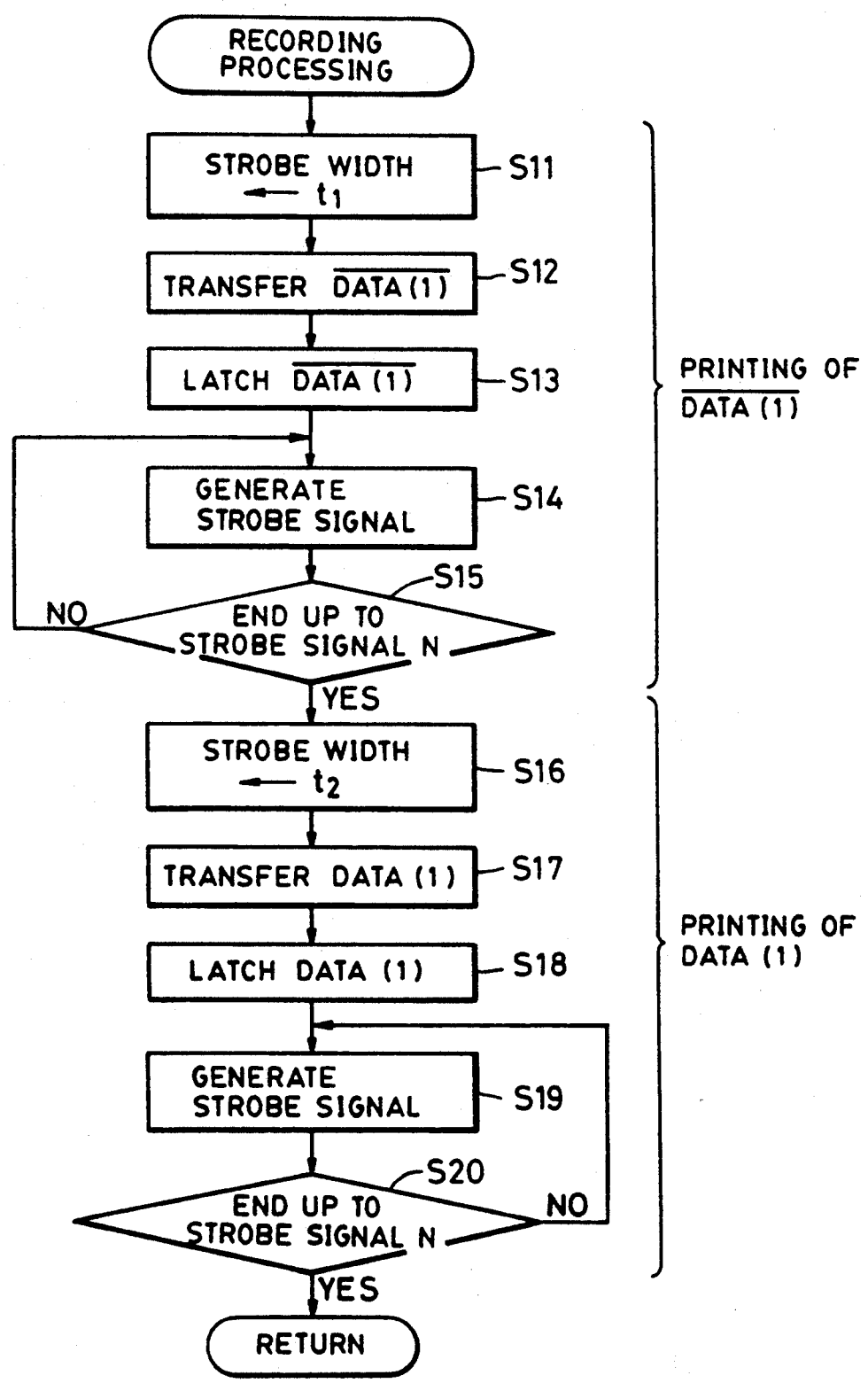

FIG. 22 is a flow chart showing a procedure for recording data which have been binary-coded in the binary-coding processing unit shown in FIG. 4. The process first proceeds to step S11, where a parameter $t_1$, for example, $t_1 = 0.3$ msec, is set in the printing-strobe-width determination circuit of the thermal head control circuit 1107.

Figure 23:
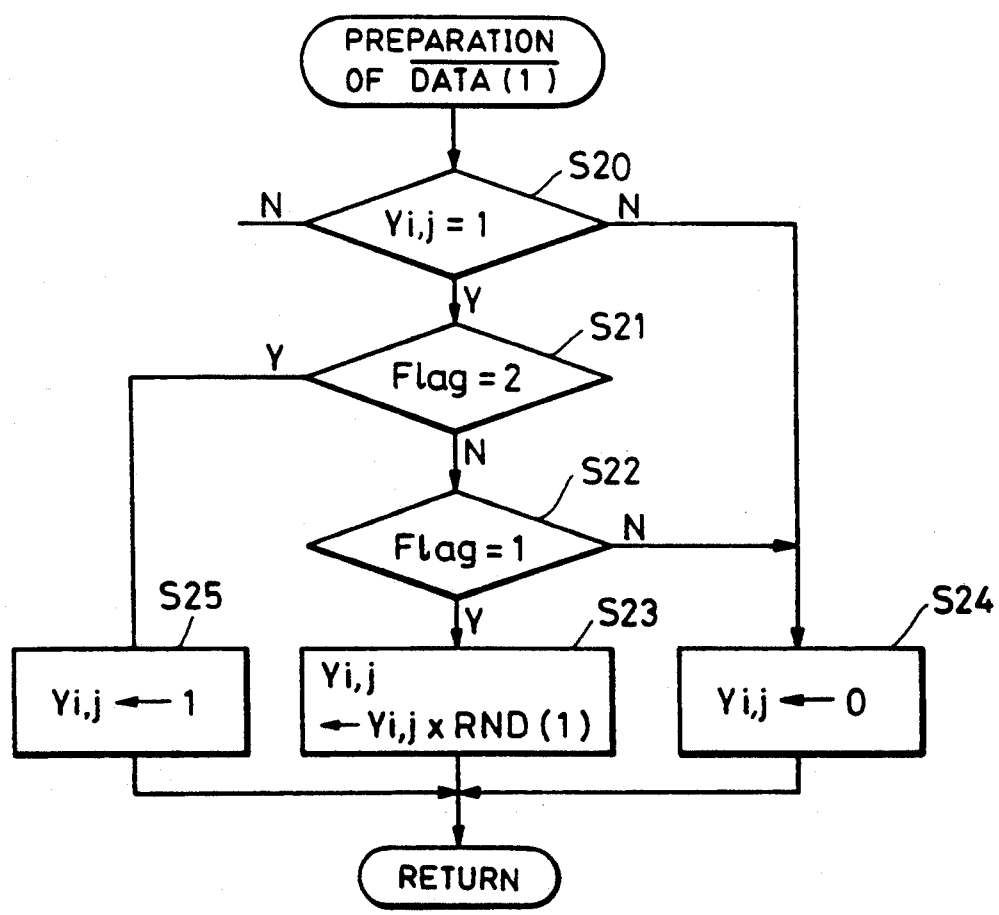

At step S12, binary data DATA (1) to be first printed are set in the shift register 1108. The DATA (1) are prepared in the thermal head control circuit 1107. The flow chart for preparing the DATA (1) is shown in FIG. 23. At step S20, if the value of a binary-coded output signal $Y_{i,j}$ is $Y_{i,j} = 1$ (printing of black), the process proceeds to step S21. If $Y_{i,j} = 0$ (printing of white), the process proceeds to step S24, where it is arranged that $Y_{i,j} = 0$.

At step S21, the value of Flag 417 is investigated, and if Flag = 2 (dark sigal), the process proceeds to step S25, where it is arranged that $Y_{i,j} = 1$, and if Flag≠2, the process proceeds to step S22.

At step S22, the value of Flag 417 is investigated, and if Flag = 1 (half-tone), the logical product of an output signal of the random number generation circuit for generating a signal of 0 or 1 and the $Y_{i,j}$ is obtained to make it $Y_{i,j}$.

If Flag≠1, an arrangement is made that $Y_{i,j} = 0$.

A pulse train of 2048 $Y_{i,j}$'s obtained in the above-described operation is DATA (1).

At step S13 in FIG. 22, the data DATA (1) in the shift register 1108 are latched in the latch circuit 1109.

Strobe signal (1) having a pulse width of $t_1$ is switched on at step S14, and thereby the corresponding heating resistors 1111 are heated once when the value of data latched in the latch 1109 is 1.

Heat-sensitive recording paper is thereby colored.

By repeating this operation up to strobe signal (N), a first recording processing for one line is completed.

The process further proceeds to step S16, where a parameter $t_2$ ($t_2 = 0.4$ msec) is then set in the printing-strobe-width determination circuit of the thermal head control circuit 107.

At step S16, data DATA (1) to be printed again are set on the same position where the DATA (1) have been printed.

At step S17, the data DATA (1) in the shift register 1108 are latched in the latch circuit 1109.

At step S18, a strobe signal having a pulse width of $t_2$ is switched on, and the corresponding each heating resistor 1111 is heated once when the value of data latched in the latch 1109 is 1.

Figure 24:
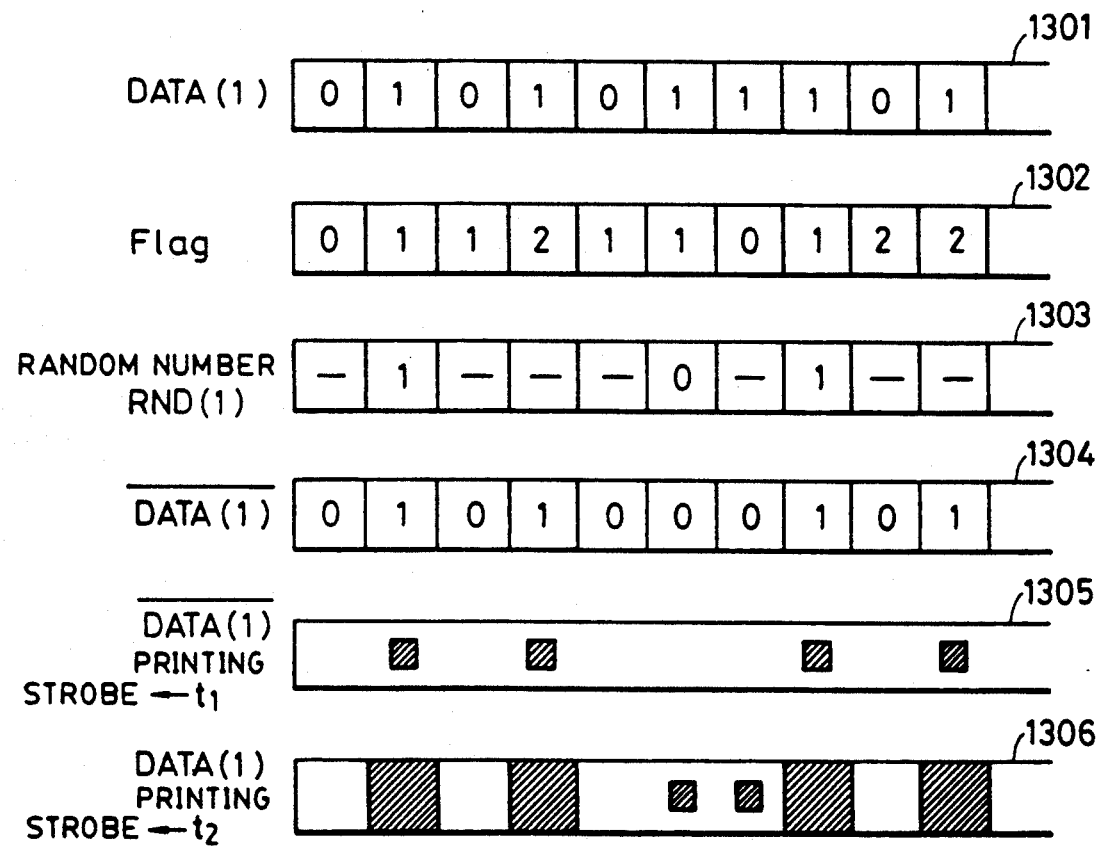
Figure 25:
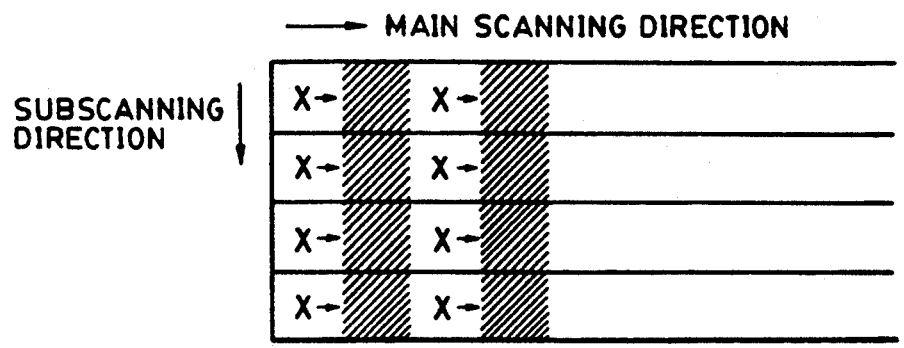
FIG. 25 is a diagram showing a problem in the prior art.

The appearance resulting when one line is separately printed twice is shown in FIG. 24.

FIG. 24 shows a case in which 10-bit DATA (1) 1301 are printed. It is assumed that 0 represents a white, and 1 represents a black.

According to the above-described flow chart in FIG. 23, the DATA (1) becomes DATA (1) 1304.

When the DATA (1) 1304 are printed with a strobe width $t_1$, dots on heat-sensitive paper becomes dots 1305. Since the energy provided to the paper with the strobe width $t_1$ is smaller than the energy to be originally provided (an energy by which a proper dot size by the thermal head is obtained), the dot size is smaller than a standard size.

DATA (1) 1301 are then printed with a strobe width of $t_2$ on the same position where the DATA (1) 1304 have been printed.

Finally, dots on the heat-sensitive paper become dots 1306.

Two kinds of dot sizes consisting of black dots (Dot 1) printed by the two strobe width $t_1$ and $t_2$ and black dots (Dot 2) printed only by the $t_1$ appear on the heat-sensitive paper.

That is,

Dot 2, when the input image signal $X_{i,j}$ is from a highlight portion,

Dot 1, when the input image signal $X_{i,j}$ is from a dark portion, and

Dot 1 or Dot 2, when the input image signal $X_{i,j}$ is from a half-tone portion. Either of the above-described three cases is selected and printed.

The relationship between the sizes of dots is (Dot 1) > (Dot 2).

As explained above, according to the third embodiment, connection of dots is prevented, since printing is performed reducing the dot size in highlight portions of an image. That is, it is possible thereby to prevent the generation of a unique striped pattern in the error diffusion method.

Furthermore, since printing is performed with random dot sizes, large and small, in half-tone portions, it is possible to prevent connection of dots and provide gradation in half-tone portions.

Moreover, since printing is performed with a large dot size in dark portions of an image, it is possible to prevent the occurrence of white spaces between dots.

Thus, according to the third embodiment, by changing the size of a printed dot in accordance with the density of an input image, it is possible to prevent the generation of a unique striped pattern in the error diffusion method in highlight and half-tone portions of an image, and also to prevent the occurrence of white spaces in dark portions of an image.

Although the dot size is changed by changing the strobe width in two ways in the present embodiment, the dot size may also be changed by controlling voltage or current.

Furthermore, although, in the present embodiment, a case is discussed in which image data are subjected to binary-coding processing by the error diffusion method as a method of quantization, the present invention may also similarly be utilized for a multiple-value-coding processing.

In the case of a color image, the present invention may be executed by providing the circuit in the present embodiment for three colors, R, G and B.

While the present invention has been explained in reference to the preferred embodiments, it is not limited to the above-described embodiments, but various changes and modifications are possible within the scope of the appended claims.

What is claimed is:

1. An image processing apparatus comprising:
reading means for reading an image of an original and generating brightness data;
converting means for converting the brightness data generated by said reading means into density data;
binarizing means for binarizing the density data obtained by said converting means, by an error diffusion method; and
outputting means for outputting binary data obtained by said binarizing means to a laser beam printer, wherein said converting means converts to 0 density data for brightness data of a predetermined value or more.

2. An image processing apparatus according to claim 1, wherein said binarizing means binarizes the density data by correcting an error between the density data converted by said converting means and the binary data after binarization.

3. An image processing apparatus according to claim 1, further comprising determination means for determining to which among highlight, half-tone and dark regions the density level of the density data belongs.

4. An image processing apparatus according to claim 3, wherein said outputting means changes a size of a dot in accordance with a result of determination performed by said determination means.

5. An image processing apparatus according to claim 4, wherein, when said determination means determines that the density level of the density data belongs to a highlight region, said outputting means outputs the size of the dot smaller than that when the density level is determined to belong to a dark region.

6. An image processing apparatus according to claim 4, wherein said outputting means randomly changes the size of the dot between large and small when said determination means determines that the density level of the density data belongs to a half-tone region.

7. An image processing apparatus according to claim 4, wherein said outputting means changes the size of the dot by changing the intensity of a laser beam in accordance with the determination result obtained by said determination means.

* * * * *